(12) United States Patent
Lalonde et al.

(10) Patent No.: US 11,813,521 B2
(45) Date of Patent: *Nov. 14, 2023

(54) MEMORY MANAGEMENT IN GAMING RENDERING

(71) Applicant: GOOGLE LLC, Mountain View, CA (US)

(72) Inventors: Paul Lalonde, Kitchener (CA); Paul Leventis, Toronto (CA); Jean-François Roy, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/216,115

(22) Filed: Mar. 29, 2021

(65) Prior Publication Data

US 2021/0213354 A1 Jul. 15, 2021

Related U.S. Application Data

(63) Continuation of application No. 16/380,831, filed on Apr. 10, 2019, now Pat. No. 11,110,348, which is a
(Continued)

(51) Int. Cl.
*A63F 13/355* (2014.01)
*G06F 12/123* (2016.01)
(Continued)

(52) U.S. Cl.
CPC .......... *A63F 13/355* (2014.09); *G06F 12/123* (2013.01); *G06T 1/20* (2013.01);
(Continued)

(58) Field of Classification Search
None
See application file for complete search history.

(56) References Cited

U.S. PATENT DOCUMENTS 5,892,897 A 4/1999 Carlson et al.
6,393,582 B1 5/2002 Klecka et al.
(Continued)

FOREIGN PATENT DOCUMENTS

CN 1556958 A 12/2004
CN 101068258 A 11/2007
(Continued)

OTHER PUBLICATIONS

Notice of Allowance dated Sep. 14, 2022 for U.S. Appl. No. 17/223,226, 62 pages.
(Continued)

*Primary Examiner* — Steven Z Elbinger

(57) ABSTRACT

Some implementations of this application are directed to a server system including one or more CPUs, a plurality of GPUs, main dynamic memory storing programs and data for use by the CPUs and/or GPUs during program execution, a static memory pool stored in a non-volatile memory, and a memory controller configured to manage the static memory pool. Each of the GPUs includes a local cache and is configured to access the static memory pool via the memory controller. The server system executes a plurality of gaming sessions for a gaming title in parallel on the one or more CPUs. Each of the plurality of gaming sessions is associated with a static data item stored in the static memory pool, and requires a graphics operation executable by a respective GPU using the static data item.

24 Claims, 19 Drawing Sheets

Related U.S. Application Data continuation of application No. PCT/US2019/026611, filed on Apr. 9, 2019.

(60) Provisional application No. 62/655,688, filed on Apr. 10, 2018.

(51) Int. Cl.
*G06T 1/20* (2006.01)
*G06T 1/60* (2006.01)
*G06T 15/00* (2011.01)

(52) U.S. Cl.
CPC .............. *G06T 1/60* (2013.01); *G06T 15/005* (2013.01); *A63F 2300/538* (2013.01)

(56) References Cited

U.S. PATENT DOCUMENTS

| | | |
|---|---|---|
| 7,015,909 B1 | 3/2006 | Morgan III et al. |
| 9,208,642 B2 | 12/2015 | Merari |
| 9,295,915 B2 | 3/2016 | Bruno, Jr. et al. |
| 9,628,332 B2 | 4/2017 | Bruno, Jr. et al. |
| 10,016,689 B2 | 7/2018 | Lucas et al. |
| 10,244,765 B2 | 4/2019 | Pierce et al. |
| 11,128,636 B1 | 9/2021 | Jorasch et al. |
| 11,369,873 B2 | 6/2022 | Smullen et al. |
| 2002/0144177 A1 | 10/2002 | Kondo et al. |
| 2007/0203768 A1 | 8/2007 | Adra |
| 2008/0102955 A1 | 5/2008 | D'Amora et al. |
| 2009/0111576 A1 | 4/2009 | Ostergren et al. |
| 2009/0119730 A1 | 5/2009 | Perlman et al. |
| 2010/0016081 A1 | 1/2010 | Prochnow |
| 2010/0073712 A1 | 3/2010 | Cain |
| 2011/0124417 A1* | 5/2011 | Baynes ................ A63F 13/798 463/43 |
| 2013/0017443 A1 | 1/2013 | Yamazaki |
| 2014/0043333 A1* | 2/2014 | Narayanan .............. G06T 15/80 345/426 |
| 2014/0066195 A1 | 3/2014 | Matsui et al. |
| 2014/0179426 A1 | 6/2014 | Perry et al. |
| 2014/0323230 A1 | 10/2014 | Wakitani et al. |
| 2014/0359156 A1 | 12/2014 | Manber |
| 2015/0024842 A1 | 1/2015 | Imai et al. |
| 2015/0109185 A1 | 4/2015 | Shimamura et al. |
| 2015/0194136 A1 | 7/2015 | Diard et al. |
| 2015/0221063 A1 | 8/2015 | Kim et al. |
| 2016/0171757 A1* | 6/2016 | Panneer ................ G06T 15/005 345/426 |
| 2016/0354688 A1 | 12/2016 | Harkham |
| 2017/0007659 A1 | 1/2017 | Wadhwa et al. |
| 2017/0050111 A1 | 2/2017 | Perry et al. |
| 2017/0087460 A1 | 3/2017 | Perry |
| 2018/0253880 A1 | 9/2018 | Yeh et al. |
| 2018/0290061 A1 | 10/2018 | Payzer et al. |
| 2019/0259130 A1 | 8/2019 | Yeh et al. |
| 2019/0262723 A1 | 8/2019 | Trombetta et al. |
| 2019/0344163 A1 | 11/2019 | Imada |
| 2021/0146240 A1 | 5/2021 | Colenbrander |

FOREIGN PATENT DOCUMENTS

| | | |
|---|---|---|
| CN | 101887485 A | 11/2010 |
| CN | 102195935 A | 9/2011 |
| CN | 104598292 A | 5/2015 |
| CN | 104866699 A | 8/2015 |
| CN | 105749551 A | 7/2016 |
| CN | 107050858 A | 8/2017 |
| CN | 107666943 A | 2/2018 |
| CN | 107670275 A | 2/2018 |
| EP | 2621594 B1 | 8/2016 |
| JP | 2003236251 A | 8/2003 |
| WO | 2004004857 A1 | 1/2004 |
| WO | 2005074063 A2 | 8/2005 |
| WO | 2007033005 A2 | 3/2007 |
| WO | 2007044908 A2 | 4/2007 |
| WO | 2013151748 A2 | 10/2013 |
| WO | 2015098165 A2 | 7/2015 |
| WO | 2015164397 A2 | 10/2015 |
| WO | 2015175231 A2 | 11/2015 |
| WO | 2016014603 A1 | 1/2016 |

OTHER PUBLICATIONS

Non-Final Office Action dated Sep. 9, 2022 for U.S. Appl. No. 15/734,275, 18 pages.

Nourani, Mehrdad, et al., "Coping with physical failures, soft errors, and reliability issues," System-on-Chip Test Architectures. Morgan Kaufmann, 2008, pp. 351-422.

Emmerson, Richard et al., "Fault tolerance achieved in VLSI," IEEE Micro 4.6, Dec. 1984, pp. 34-43.

Non-Final Office Action dated Oct. 6, 2022 for U.S. Appl. No. 16/844,937, 9 pages.

First Examination Report dated Jun. 26, 2021 for Indian Application No. 202047027952, 6 pages.

Notice of Allowance dated Aug. 11, 2021 for U.S. Appl. No. 16/849,805, 64 pages.

English Translation of Chinese Office Action dated Aug. 11, 2021 for CN Application No. 201980007131.3, 21 pages.

Notice of Allowance dated Feb. 14, 2022 for U.S. Appl. No. 16/566,607, 11 pages.

Malfatti, Silvano Maneck et al., "Using Mobile Phones to Control Desktop Multiplayer Games," 2010 Brazilian Symposium on Games and Digital Entertainment, IEEE Computer Society; Nov. 8, 2010; pp. 230-238.

Veljkovic, Nikola et al., "TV-Centric Multiplayer Gaming over the Cloud for Consumer Electronic Devices," 2013 IEEE Third International Conference on Consumer Electronics, Berlin; Sep. 1, 2013; pp. 1-3.

Non-Final Office Action dated Mar. 21, 2022 for U.S. Appl. No. 16/844,937, 7 pages.

Notice of Allowance dated Mar. 22, 2022 for U.S. Appl. No. 17/123,523, 9 pages.

Final Office Action dated Jun. 29, 2022 for U.S. Appl. No. 16/844,937, 9 pages.

European Office Action dated Jun. 14, 2022 for EP Application No. 21175400.7, 7 pages.

English Translation of Japanese Office Action dated May 18, 2021 for JP Application No. 2019-220516, 7 pages.

Notice of Allowance dated May 17, 2021 for U.S. Appl. No. 15/851,610, 23 pages.

English Translation of Chinese Office Action dated May 21, 2021 for CN Application No. 20198029685.3, 15 pages.

Extended European Search Report dated May 21, 2021 for EP Application No. EP 21169156.3, 9 pages.

IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.

Weekly ASCII, "Angry Birds Friends, a smartphone game to compete for high score with Facebook friends", May 31, 2013, URL https://weekly.ascii.jp/elem/000/002/615/2615748/.

Final Office Action dated Nov. 26, 2021 for U.S. Appl. No. 16/566,607, 18 pages.

Non-Final Office Action dated Nov. 26, 2021 for U.S. Appl. No. 15/734,275, 24 pages.

English Translation of Chinese Office Action dated Oct. 18, 2021, 10 pages.

Non-Final Office Action dated Nov. 29, 2021 for U.S. Appl. No. 17/123,523, 7 pages.

English Translation of Korean Notice of Allowance dated Nov. 5, 2021 for KR Application No. 10-2020-7015094, 3 pages.

Ikeda, Takatoshi et al., "An Instruction Allocation Method for Accelerating GPU Applications", Journal of Information Processing, Aug. 15, 2005, vol. 46, SIG12(ACS11), p. 140-149.

Final Office Action dated May 16, 2022 for U.S. Appl. No. 15/734,275, 27 pages.

(56) References Cited

OTHER PUBLICATIONS

English Translation of Korean Office Action dated Apr. 14, 2022 for KR Application No. 10-2020-7030955, 19 pages.
Non-Final Office Action dated Oct. 26, 2022 for U.S. Appl. No. 17/402,761, 21 pages.
Translation of Chinese Office Action dated Nov. 17, 2022 for Chinese Application No. 201880033465.3, 24 pages.
Extended European Search Report dated Dec. 16, 2022 for European Application No. 22202122.2, 10 pages.
Non-Final Office Action dated Dec. 8, 2022 for U.S. Appl. No. 17/521,133, 6 pages.
Notice of Allowance dated Feb. 1, 2023 for U.S. Appl. No. 17/223,226, 41 pages.
Notice of Allowance dated Feb. 13, 2023 for U.S. Appl. No. 15/734,275, 53 pages.
Notice of Allowance dated Feb. 13, 2023 for U.S. Appl. No. 16/844,937, 327 pages.
English Translation of Korean Office Action dated Mar. 3, 2022 for KR Application No. 10-2022-7023033, 8 pages.
Notice of Allowance dated Mar. 27, 2023 for U.S. Appl. No. 17/521,133, 7 pages.
Corrected Notice of Allowability dated Apr. 24, 2023 for U.S. Appl. No. 17/223,226, 7 pages.
Corrected Notice of Allowability dated Apr. 28, 2023 for U.S. Appl. No. 15/734,275, 10 pages.
Non-Final Office Action dated May 12, 2023 for U.S. Appl. No. 17/402,761, 37 pages.
Notice of Allowance dated Apr. 28, 2023 for EP Application No. 21169156.3, 97 pages.
Notice of Allowance dated Mar. 7, 2023 for EP Application No. 18797260.9, 118 pages.
Supplemental Notice of Allowability dated May 16, 2023 for U.S. Appl. No. 17/521,133, 6 pages.

\* cited by examiner

| Performance Criterion 1 | First sequence of compiled shaders |
|---|---|
| Performance Criterion 2 | Second sequence of compiled shaders |
| Performance Criterion 3 | Third sequence of compiled shaders |
| ... | ... |
| Performance Criterion N | Nth sequence of compiled shaders |

Figure 11B

| Use inputs A | Version 1 |
|---|---|
| Use inputs B | Version 2 |
| Use inputs C | Version 3 |
| ... | ... |
| Use inputs N | Version N |

Figure 11C

MEMORY MANAGEMENT IN GAMING RENDERING

RELATED APPLICATIONS

This application is a continuation of U.S. patent application Ser. No. 16/380,831, entitled "Memory Management in Gaming Rendering," filed on Apr. 10, 2019, which is a continuation of PCT International Application No. PCT/US19/26611, entitled "Memory Management in Gaming Rendering," filed on Apr. 9, 2019, which claims priority to U.S. Provisional Patent Application No. 62/655,688, entitled "Memory Management in Gaming Rendering," filed on Apr. 10, 2018, which are incorporated by reference herein in their entirety.

This application is related to PCT International Application No. PCT/US18/55055, titled "Distributed Sample-Based Game Profiling with Game Metadata and Metrics and Gaming API Platform Supporting Third-Party Content," filed Oct. 9, 2018, which claims priority to U.S. Provisional Patent Application No. 62/570,648, titled "Gaming API Platform Supporting Third-Party Content," filed on Oct. 10, 2017, each of which is incorporated by reference herein in its entirety.

This application is related to U.S. Provisional Patent Application No. 62/651,662, titled "Detecting and Compensating for Display Lag in Gaming Systems," filed on Apr. 2, 2018, which is incorporated by reference herein in its entirety.

This application is related to U.S. Provisional Patent Application No. 62/651,665, titled "Temporary Game Control by User Stimulation Following Loss of Active Control," filed on Apr. 2, 2018, which is incorporated by reference herein in its entirety.

This application is related to PCT International Application No. PCT/US19/22472, titled "Methods, Devices, and Systems for Interactive Cloud Gaming," filed on Mar. 15, 2019, which claims priority to U.S. Provisional Patent Application No. 62/651,542, titled "Methods, Devices, and Systems for Interactive Cloud Gaming," filed on Apr. 2, 2018, which is incorporated by reference herein in its entirety.

This application is related to PCT International Application No. PCT/US19/20935, titled "Methods and Systems for Rendering and Encoding Content for Online Interactive Gaming Sessions," filed on Mar. 6, 2019, which claims priority to U.S. Provisional Patent Application No. 62/646,824, titled "Methods and Systems for Rendering and Encoding Content for Online Interactive Gaming Sessions," filed on Mar. 22, 2018, which is incorporated by reference herein in its entirety.

This application is related to U.S. patent application Ser. No. 15/599,408, titled "Method and Systems for Facilitating Participation in a Game Session," filed May 18, 2017, which claims the benefit of U.S. Provisional Patent Application No. 62/339,052, titled "Method and Systems for Facilitating Participation in a Game Session," filed May 19, 2016, each of which is incorporated by reference herein in its entirety.

TECHNICAL FIELD

This application relates generally to computer technology, including but not limited to methods and systems for managing a server system to support multiple online interactive sessions corresponding to one or more real time user-interactive applications.

BACKGROUND

Internet-connected electronic devices can support a variety of cloud-based media and entertainment applications. These applications include media streaming applications in which a server streams content to user devices, gaming applications in which a user interacts from a user device with a game that executes on a server, and a variety of social media and communication applications that allow large numbers of users to interact concurrently with each other and with cloud-hosted content and applications via their Internet-connected devices. Among cloud-based applications, cloud gaming presents some unique challenges due to: the widely varying hardware demands of gaming titles; the diverse topologies in which cloud-based games can be played (e.g., by a single player, by multiple players in a single location, or by multiple players in multiple locations); the need to transmit reliably and without latency player inputs to a gaming server that executes a gaming session and gaming session outputs from the gaming server to the players' devices/displays; widely varying player expectations as to speed and responsiveness of gameplay; and the desire in some situations to provide near-real time gaming content to spectators. Other challenges of cloud based gaming relate to providing a consistent gameplay experience for players regardless of where they are located (e.g., close or far from the server), how they connect to the gaming service (e.g., via a fast or slow Internet connection), and what type of device(s) they use to play the game (e.g., a generic personal device or a dedicated game controller) and view gameplay outputs (e.g., a personal device or a media device connected to a media streaming device).

Specifically, there is a need for a cloud gaming system that supports multiple gaming sessions for multiple gaming titles, where the games can execute concurrently with acceptable latency and responsiveness, including for multiple players who are playing the same gaming title from the same or different locations, with a wide variety of input and output devices and network connections. In addition, there is a need for a cloud gaming system that, upon receiving a player input (e.g., a gaming input entered on an end use gaming device/controller) in a gaming session, processes the user input promptly and outputs high-definition images reflecting the outcome of the player input action for all of the game players simultaneously and with acceptable latency. There is also a need for a gaming system that, in some situations, provides a high definition video stream of gameplay activity to allow spectators to follow the gameplay in real time on the respective display devices. As such, it would be beneficial to provide a cloud gaming system with efficient game processing and output mechanisms to expand gaming experience in a wide range of gaming settings, from spontaneous gameplay by users gathered in the same location to online interactive gameplay by multiple users from different locations.

SUMMARY

Implementations described in this specification are directed to configuring computation and storage resources of a server system to facilitate concurrent execution of a plurality of online gaming sessions with acceptable latency and responsiveness. For example, a static memory pool stored in a non-volatile memory may be provided to store static data items that are normally stored in a main dynamic memory requiring constant refresh. This static memory pool is shared by multiple processors of the server system, and can be accessed at a reasonably fast rate without demanding as much power as needed by the main dynamic memory. A size of the main dynamic memory can be reduced because part of the main dynamic memory is replaced by the static memory pool to store the static data items. Further, a shader cache stores more than one sequence of compiled shaders to ensure that the plurality of gaming sessions is rendered with desirable power and latency performances. While the plurality of online gaming sessions is processed using one of the sequences of compiled shaders already existing in the shader cache, different sequences of compiled shaders stored in the shader cache are be dynamically generated to satisfy different performance criteria based on real time usage statistics. These different sequences of compiled shaders can be used for subsequent game content rendering of the plurality of online gaming sessions.

In one aspect of the application, a method of managing storage capability of a server system that includes one or more central processing units (CPUs), a plurality of graphics processing units (GPUs), main dynamic memory storing programs and data for use by the CPUs and/or GPUs during program execution, a static memory pool stored in a non-volatile memory, and a memory controller configured to manage the static memory pool. Each of the GPUs includes a local cache and is configured to access the static memory pool via the memory controller. The method includes executing a plurality of gaming sessions for a gaming title in parallel on the one or more CPUs. Each of the plurality of gaming sessions is associated with a static data item and requires a graphics operation executable by a respective GPU using the static data item. The static data item is stored in the static memory pool. The method further includes for a first one of the plurality of gaming sessions executed on the one or more CPUs, assigning the graphics operation to a first GPU, requesting by the first GPU a first copy of the static data item from the memory controller, receiving from the memory controller the first copy of the static data item read from the static memory pool, performing by the first GPU the graphics operation using the first copy of the static data item, and storing locally (e.g., in the local cache, in particular in the local cache of the first GPU) a first result of the graphics operation in association with the first one of the plurality of gaming sessions. The method further includes for a second one of the plurality of gaming sessions executed on the one or more CPUs, assigning the graphics operation to a second GPU, requesting by the first GPU a second copy of the static data item from the memory controller, receiving from the memory controller the second copy of the static data item read from the static memory pool, performing by the second GPU the graphics operation using the second copy of the static data item, storing locally (e.g., in the local cache, in particular in the local cache of the first GPU) a second result of the graphics operation in association with the second one of the plurality of gaming sessions.

In another aspect, a method of loading a gaming title onto a server system that includes one or more CPUs, a plurality of GPUs, main dynamic memory storing programs and data for use by the CPUs and/or GPUs during program execution, a static memory pool stored in a non-volatile memory, and a memory controller configured to manage the static memory pool. Each of the GPUs is configured to access the static memory pool via the memory controller. The method includes loading by the CPUs an executable gaming program corresponding to the gaming title to the main dynamic memory. The CPUs are configured to execute a plurality of online gaming sessions in parallel. Each of the gaming sessions corresponds to the executable gaming program and requires a graphics operation executable by a respective GPU assigned to render the respective online gaming session. The method further includes identifying by the CPUs a static data item used in the graphics operation of the plurality of gaming sessions, storing by the memory controller the static data item in the static memory pool, and enabling by the memory controller the GPUs' executing the online gaming sessions to access the static data item while performing the graphics operation.

In yet another aspect, a method of rendering image frames for online gaming sessions is implemented at a server system that includes one or more CPUs, one or more GPUs, main dynamic memory storing programs and data for use by the CPUs and/or GPUs during program execution, and a shader cache. The method includes executing on the one or more CPUs a plurality of online gaming sessions in parallel for a gaming title and rendering by the GPUs a plurality of image frames for each of the plurality of online gaming sessions using a first sequence of compiled shaders. The method further includes while executing the plurality of online gaming sessions, identifying a performance criterion for the plurality of online gaming sessions associated with the gaming title, collecting usage statistics characterizing execution of each of the online gaming sessions, and modifying a first shader in the first sequence of compiled shaders to improve performance of the first sequence of compiled shaders with respect to the performance criterion, thereby creating a modified first sequence of compiled shaders.

In accordance with some aspects of this application, a server system includes memory storing instructions for causing the server system to perform any of the methods described above.

Further, in accordance with some aspects of this application, a non-transitory computer readable storage medium storing one or more applications configured for execution by a server system include instructions for causing the server system to perform any of the methods described above.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 11B is a shader hash table associating a plurality of sequences of compiled shaders with a plurality of performance criteria in accordance with some implementations. FIG. 11C is a shader hash table associating a plurality of versions of a sequence of compiled shaders with a plurality of user inputs in accordance with some implementations.

Like reference numerals refer to corresponding parts throughout the drawings.

DESCRIPTION OF IMPLEMENTATIONS

Figure 1:
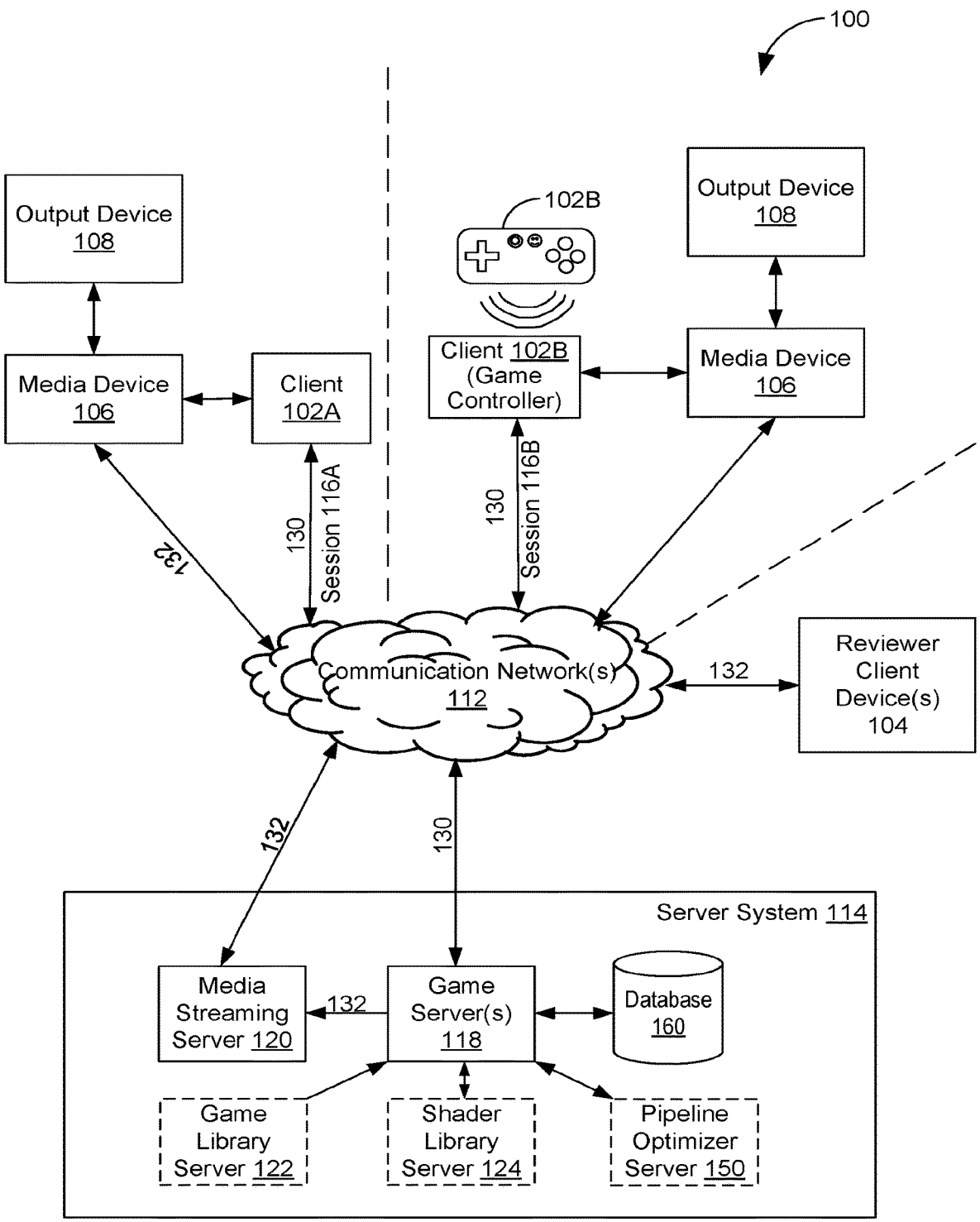
FIG. 1 is an example online interactive gaming environment including a server system and a plurality of client devices in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, and networks have not been described in detail so as not to unnecessarily obscure aspects of the implementations.

Implementations described in this specification are directed to providing a gaming environment to enable efficient, portable, low latency, and interactive gaming experience for a community of distributed game players. Some implementations dynamically allocate cloud gaming hardware resources (e.g., GPU and encoder) and monitor and utilize network bandwidth available to individual end users to provide optimal online gaming experience concurrently to a large number of game players. Some implementations manage cloud gaming storage resources to provide online gaming experience efficiently. For example, a gaming server system can add a level of static gaming storage resources for storing static data items used in gaming content rendering to reduce a demand for dynamic memory that has relatively large power consumption. Some implementations dynamically optimize a sequence compiled shaders to satisfy one or more performance criteria according to real-time usage statistics of a plurality of online gaming sessions, while the compiled shaders are used in the foreground to render gaming content for these online gaming sessions.

Specifically, in some implementations, a server system includes one or more CPUs, a plurality of GPUs, main dynamic memory storing programs and data for use by the CPUs and/or GPUs during program execution. Each of the GPUs includes a local cache. A static memory pool stored in a non-volatile memory is added to the server system. A memory controller of the server system is configured to manage the static memory pool, e.g., provide write and/or read accesses to the static memory pool to each of the GPUs. In an example, the main dynamic memory is a dynamic random-access memory (DRAM) that needs to be refreshed constantly, and the static memory pool is a phase-change random-access memory (PRAM) that does not need to be refreshed as far as it is connected to a power supply.

The server system executes a plurality of gaming sessions for a gaming title in parallel on the one or more CPUs. Each of the plurality of gaming sessions is associated with a static data item and requires a graphics operation (e.g., vertex processing, tessellation and primitive assembly in an open graphics library (OpenGL) rendering pipeline) executable by a respective GPU using the static data item. The static data item is stored in the static memory pool. To execute each of the plurality of gaming sessions, the CPUs assigns the graphics operation to a respective GPU, which requests a copy of the static data item from the memory controller for the purposes of executing the graphics operation. The respective GPU receives from the memory controller the copy of the static data item read from the static memory pool, and performs the graphics operation using the copy of the static data item. A result of the graphics operation is stored locally (e.g., in the local cache or in the main dynamic memory) in association with the respective one of the plurality of gaming sessions.

In some implementations, the static data item stored in the static memory pool is loaded to the static memory pool when the CPUs load an executable gaming program (e.g., a server-side game module) corresponding to a gaming title to the main dynamic memory. Specifically, the CPUs determine that the static data item is used in the graphics operation, and control the memory controller to store the static data item in the static memory pool. The static data item is optionally extracted from a local hard drive of the server system or received from a remote library server. When the static data item is stored in the static memory pool, the static data item does not need to be stored in the main dynamic memory, thereby allowing the main dynamic memory to improve its efficiency by reducing its size and power consumption without compromising performance of the CPUs and GPUs in the server system.

In some implementations, a server system includes one or more CPUs, one or more GPUs, a main dynamic memory storing programs and data for use by the CPUs and/or GPUs during program execution, and a shader cache. The server system executes on the CPUs a plurality of online gaming sessions in parallel for a gaming title, and the one or more GPUs renders a plurality of image frames for each of the plurality of online gaming sessions using a first sequence of compiled shaders. While executing the plurality of online gaming sessions in the foreground, the server system, in the background, identifies a performance criterion (e.g., related to power usage and gaming latencies) for the plurality of online gaming sessions associated with the gaming title, and collects usage statistics (e.g., user inputs, power usage and gaming latencies) characterizing execution of each of the online gaming sessions. The server system modifies a first shader in the first sequence of compiled shaders to improve performance of the first sequence of compiled shaders with respect to the performance criterion, thereby creating a modified first sequence of compiled shaders. Optionally, the modified first sequence of compiled shaders are stored as a distinct sequence of compiled shaders, as a new version of the first sequence of compiled shaders, or in place of the first sequence of compiled shaders. The modified first sequence of compiled shaders can be subsequently used to render image frames for the plurality of online gaming sessions, and improve performance associated with the performance criterion of these online gaming sessions. By these means, the compiled shaders are dynamically optimized based on the real-time usage statistics of the online gaming sessions and without suspending execution of the online gaming sessions.

Gaming Environment Hosting Multiple Gaming Sessions of a Gaming Title

FIG. 1 is an example online interactive gaming environment 100 in accordance with some implementations. The online interactive gaming environment 100 includes one or more client devices (e.g., client devices 102 and 104). Each of the client devices 102 executes one or more game applications. An online game session can be initiated and run on a specific game application to allow a user of the client device 102 to play an online interactive game (also called "gaming title") hosted by a server system 114. In some implementations, the client device 102 (e.g., a host client) is configured to invite one or more other client devices 102 to join a game scene of the online interactive game. Gaming sessions of these client devices 102 are synchronized to display the same game scene of the online interactive game, optionally with distinct perspectives corresponding to their respective users.

Conversely, the server system 114 hosts an online interactive game platform to support the client devices 102 to play the one or more game applications including the specific game application. Specifically, the server system 114 includes a plurality of user accounts associated with the client devices 102, and authenticates the users of the client devices 102 in association with each of the one or more game applications. The server system 114 renders and refreshes a scene of a gaming title on the client devices 102 that join corresponding gaming sessions associated with the scene. In some implementations, the server system 114 may assess the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, a client device 102 has a display screen integrated therein for displaying media content associated with a respective online gaming session. In some implementations, a client device 102 is coupled to a media device 106 and an output device 108. Specifically, the client device 102 can be communicatively coupled to the media device 106 directly (e.g., via a wire, via Bluetooth or other wireless communication links), via a local network 110 (e.g., a Wi-Fi network), or via one or more communication networks 112. In some implementations, the client device 102 and the media device 106 are local to each other (e.g., in the same room, in the same house, etc.). The media device 106 is further coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality. For example, when gaming content is rendered by the server system 116 in response to a user input at the client device, the client device 102 controls the media device 106 to receive the gaming content from the server system 116 via the communication networks 112 and cast the received gaming content onto the output device 108.

In some implementations, the server system 114 includes a game server 118 and a media streaming server 120. The game server 118 is configured to provide two or more media streams 130 and 132 concurrently for an online interactive game session running on a first client device 102A. The two or more media streams include a low latency stream 130 and a normal latency stream 132 that are provided to the first client device 102A and a reviewer client device 104 via one or more communication network 112, respectively. Optionally, the normal latency stream 132 is provided for instructional purposes. While a user the first client device 102A plays the game session on the first client device 102A, the game session is recorded and broadcast to one or more spectators via the normal latency stream 132, i.e., the spectators can review the game session on the reviewer client device 104. The low latency stream 130 corresponds to gameplay of the online interactive game session, and has a faster response rate and lower transmission latency than the normal latency stream 132 that corresponds to an associated review session. Optionally, the reviewer client device 104 is located in the same venue as the client device 102. Optionally, the reviewer device is remote from the client device 102. In some implementations, the reviewer client device 104 is another client device like the client device 102A optionally having an integrated or external display. In some implementations, the reviewer client device 104 is a media device 106 (e.g., a device having casting functionality) coupled to one or more output devices 108 that can output visual and/or audio content. In some implementations, both the low latency stream and the normal latency stream are displayed on a screen of the same output device.

Each client device 102 is capable of data communication and information sharing with a central server or cloud-computing system (e.g., the server system 114), and/or other devices (e.g., another client device 102, a reviewer client device 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router (not shown in FIG.

1)) via which a set of client devices 102 and their corresponding media and output devices (if any) are communicatively coupled to each other on a local area network. The local area network is communicatively coupled to other part of the communication networks 112 (e.g., wide-area networks and the Internet). In some embodiments, each of the client devices 102 optionally communicates with one or more other client devices 102 or 104, a respective media device 106, or a respective output device 108 using one or more radio communication networks (e.g., ZigBee, Z-Wave, Insteon, Bluetooth, Wi-Fi, and/or other radio communication networks).

In some implementations, the client devices 102 are remote from each other, i.e., they are not located in the same room or even structure. A gaming title may be started on a client device 102 by launching a game application (e.g., game application 629, FIG. 6) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain of the gaming title), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102. For example, in some implementations, the game applications 528 are configured to maintain consistent game states among and between users who are concurrently playing the same game. In some implementations, the server system 114 and game applications 528 maintain individual sessions for each user playing a game that might result in a rendered view of a scene that is particular to that user's individual game play state and view, but each of those sessions are consistent with other sessions of users who are playing the same game and interacting with and viewing the same scene.

Alternatively, in some other implementations, after the game application of a first client device 102A establishes an online gaming session 116A, one or more second client devices 102B are invited to join the online gaming session 116A by an invitation message, and for example, a message with the link (e.g., a URL address) to join the online gaming session 116A is sent to each of the second client devices 102B. An appropriate controller configuration is provided to each second client device 102B that is invited to join the online gaming session 116A. In this application, when the second clients 102B join an online gaming session 116A, the server system 114 creates a separate gaming session 116B for each individual second client device 102B. Each separate gaming session 116B of the respective second client device 102B is synchronized with and shares the same scene with the gaming session 116A of the first client device 102A, but can have a unique player perspective corresponding to the respective second client device 102B. After each second client device 102B has received the appropriate controller configuration and joined the online gaming session 116A (more accurately, started its related online gaming session 116B), a user can play the game on the respective second client device 102B and influence the output of the online gaming sessions 116 running on the other client device(s) 102.

The client device 102 is a device that includes, and can run, one or more distinct user applications including the game application. In some implementations, the client device 102 is a smartphone, a tablet device, a laptop computer, a desktop computer, a multimedia device or a remote control. In some implementations, the client device 102 includes a dedicated game controller device (e.g., game controller 102B). In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at the server system 116 or a game content host) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online game sessions 116, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

As part of the client device 102 starting or joining the gaming session 116, the server system 114 communicates with the client device 102 to set up a controller on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a gaming title can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as CHROMECAST or GOOGLE CAST by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

The server system 114 further includes a database 160. The database 16 stores at least user information associated with user accounts of each of one or more game applications (e.g., game applications 629, FIG. 6) that are hosted on the server system 114. Examples of the user information include, but are not limited to, user account information (e.g., identification and passwords), membership type, preference, and activity history. In some implementations, the database 160 stores session data associated with the online gaming sessions that are played on the client devices 102. Examples of the session data for each online gaming session 116 include, but are not limited to, a frame rate, a rendering specification, a normal latency requirement, information of GPU allocation, information of encoder allocation, identifications of related sessions, shader pipeline identification, and latest status information. The session data is accessed more frequently than the user information. In some implementations, memory storing the user information and the session data is made of a flash memory and random-access memory (RAM), respectively. In some implementations, a subset of the user information and session data is stored in each game server 118 corresponding a respective gaming title.

The server system 114 includes one or more of: one or more game servers 118, a media streaming server 120, a game library server 122, a shader library server 124 and a pipeline optimizer server 150. The game servers 118 or an alternative frontend server (not shown in FIG. 1) manages user accounts associated with the client devices 102 and 104, e.g., subscriptions to membership of one or more online interactive games by a user account. After the client devices 102 log onto their respective user accounts and start/join their online gaming sessions 116, the game servers 118 not only set up the game sessions 116, but also manage each specific gaming session 116 for a respective client device 102 by obtaining game contents from content servers (not shown), sending the game contents to the game applications executed on the client devices 102 or designated media devices 104, identifying user requests or actions, rendering gameplay outputs for the client devices 102 or media devices 104 in response to the user requests or actions, and storing game state data during the respective gaming session 116.

In some implementations, the game servers 118 dynamically allocate cloud gaming hardware resources (e.g., GPU 140 and encoder 142) and monitor and utilize network bandwidth available to individual end users to provide optimal cloud gaming experience. In some implementations, the game servers 118 provide multiple performance tiers, including a tier that supports high performance, real time gaming sessions with high definition video/media streams and another tier that supports review media streams that has correspond with little or no latency to one or more actual gaming streams. Optionally, such review media streams are provided via a media streaming site, such as YouTube, to one or more users, and the media streaming site is optionally managed by the media streaming server 120.

In accordance with some implementations, the game servers 118 are coupled to a gaming content host (not shown in FIG. 1) that provides third party gaming content. Examples of third party gaming content include, but are not limited to sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

As explained above, the server system 114 hosts one or more gaming titles, and is configured to execute a plurality of online gaming sessions of a single gaming title to support concurrent gameplay on multiple client devices. Each of the one or more gaming titles is loaded into the game server 118 before it is executed to support any online gaming session. The game library server 122 is coupled to the game servers 118, and configured to provide an executable gaming program (e.g., a server-side game module 526 in FIG. 5A) and static data items required for execution of the executable gaming program. After the executable gaming program is loaded into the game servers 118, it is executed by the CPUs to instruct the GPUs to create a plurality of image frames for each of the plurality of online gaming sessions using one or more image rendering programs (e.g., shader programs). The shader library server 124 is coupled to the game servers 118, and configure to provide standard shader programs as needed by different gaming titles. If a shader program is selected for use by a gaming title, it is retrieved from the shader library server 124, compiled by the game server 118, and stored locally in the game servers 118 for use to render the plurality of image frames for each online gaming session. In some implementations, each image frame of an online gaming session is rendered by an ordered sequence of compiled shaders (e.g., including a vertex shader, a tessellation shader, a geometry shader and a fragment shader) each of which implements one or more specific image rendering operations during the course of creating the respective image frame.

Figure 2:
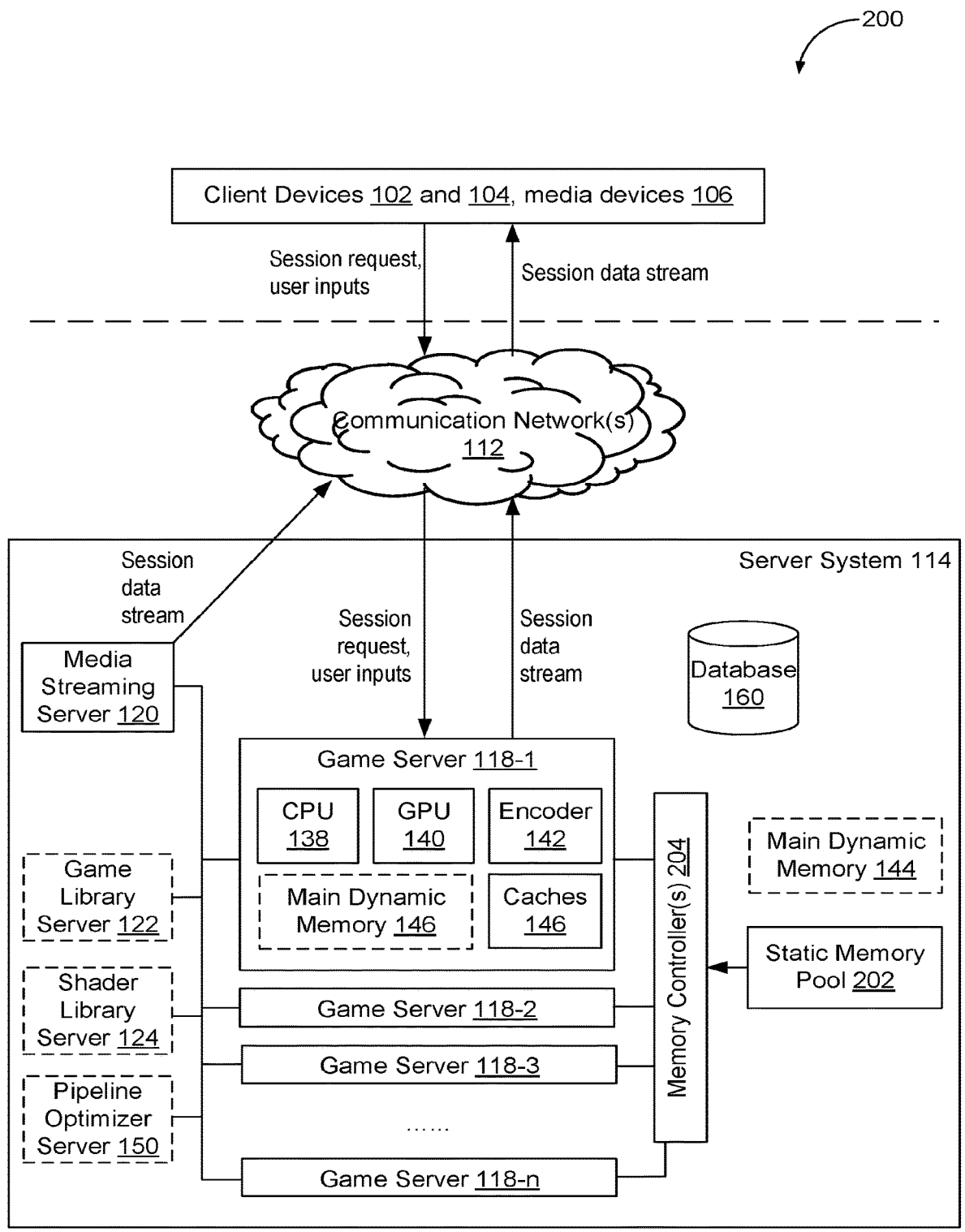
FIG. 2 is an example online interactive gaming environment in which a plurality of game servers shares a static memory pool in a server system in accordance with some implementations.

FIG. 2 is an example online interactive gaming environment 200 in which a plurality of game servers 118 share a static memory pool 202 in a server system 114 in accordance with some implementations. The server system 114 includes one or more of: the plurality of game servers 118, a media streaming server 120, a game library server 122 and a shader library server 124, and is configured to host one or more gaming titles. That said, the server system 114 is communicatively coupled to a plurality of client devices 102 over one or more communication networks 112, and executes a plurality of online gaming sessions corresponding to a gaming title in parallel, thereby allowing each of the plurality of client devices 102 to participate in gameplay under the gaming title via a respective online gaming session. The game servers 118 receive session requests from the plurality of client devices 102, and initiate, join or terminate the online gaming sessions accordingly. In response to each session request, one of the game servers 118 is assigned to execute a corresponding online gaming session. During the course of executing each online gaming session, the game server 118 assigned to execute the respective online gaming session renders a plurality of image frames (i.e., a session data stream) for a client device that has requested the online gaming session. In some situations, the plurality of image frames are rendered in response to receiving a user input (e.g., a command to jump, shoot or turn) from any of a subset of online gaming sessions that share a scene of the gaming title. Optionally, the game server 118 also generates a review media stream, and provides it directly or indirectly via the media streaming server 120 to a spectator who wants to review the gameplay in real time.

Each game server 118 includes one or more processing units (e.g., CPU 138, GPU 140 and encoder 142), main dynamic memory 144, and one or more local caches 146. The main dynamic memory 144 is configured to store programs and data for use by the CPU 138 and the GPU during execution of the programs. Optionally, each game server 118 has its own main dynamic memory 144. Optionally, a subset or all of the game servers 118 share a main dynamic memory 144. The local caches 146 are configured to temporarily stores data, e.g., media content that has completed a vertex post-processing and waits for a primitive assembly in the GPU 140, media content that is generated by the GPU 140 and will be provided to the encoder 142 for further encoding.

In some implementations, the server system 114 further includes a static memory pool 202 in addition to the main memory 144 and the caches 146. The static memory pool 202 is shared among a subset or all of the game servers 118 (e.g., 118-1, 118-2, . . . 118-N), and configured to store one or more static data items used in the plurality of online gaming sessions of the same gaming title. The server system 114 further includes a memory controller 204 configured to manage the static memory pool 202. In some implementations, each of the plurality of gaming sessions is associated with a specific static data item and requires a specific graphics operation executable by a respective GPU 140 using the specific static data item, and the specific static data item is stored in the static memory pool 202. The respective GPU 140 is configured to access the static memory pool 202 via the memory controller 204 in order to extract the specific static data item.

It is noted that in some implementations, the static data items stored in the static memory pool 202 can be stored in the main dynamic memory 144. The main dynamic memory 144 is accessed by the GPU at a faster rate than the static memory pool 202. However, the main dynamic memory 144 needs to be refreshed or given a new electronic charge every few milliseconds to compensate for charge leaks from the memory, and therefore is not efficient in power performance. If the static data items are moved to the static memory pool 202, part of the main dynamic memory 144 in the game servers 118 can be freed up and used to store more programs and dynamic data, or a smaller main dynamic memory 144 can be used to reduce power consumption.

The server system 114 has a multilevel storage scheme including the local caches 146, the main dynamic memory 144 and the static memory pool 202. The local caches 146 includes at least one cache level (e.g., L1, L2). Compared with the main dynamic memory 144 and the static memory pool 202, the local caches 146 have a smaller size, is physically closer to the CPUs and GPUs, and can be accessed at a faster rate. The local caches 146 stores copies of instructions and data retrieved from the main dynamic memory 144 or the static memory pool 202 for direct use by the CPUs 138 and GPUs 140. The main dynamic memory 144 is also called primary memory. Every program executed by the CPUs 138 and GPUs 140 is loaded into the main dynamic memory 144, and moved to the caches on a block or instruction basis prior to execution. The size of the main dynamic memory 144 is crucial because it determines how many programs can be executed at one time and how much data can be readily available to a program. The static memory pool 202 is additional to the caches 146 the main dynamic memory 144. In some implementations, the static memory pool 202 is also called a level 4 cache that can be accessed by both the CPUs 138 and GPUs 140, but is shared among the plurality of game servers 118. The static memory pool 202 has a larger latency than the local caches 146 and the main dynamic memory 144, and therefore, is used to store the static data items that are less frequently used in the online gaming sessions. In the server system 114, this multilevel storage scheme enables multiple online gaming sessions of a gaming title to be executed efficiently with respect to at least power consumption.

Data Storage in Gaming Environment

In some implementations, gaming content corresponding to a gaming title are rendered by the GPUs 140 for online gaming sessions according to a graphics pipeline process (e.g., an OpenGL rendering pipeline). The graphics pipeline process includes an ordered sequence of graphics operations, and each graphics operation is implemented based on one or more user-defined shader programs. In each graphics operation, a GPU 140 receives user inputs or outputs from a preceding graphics operation, and generates its own outputs as intermediate outputs of the respective graphics operation or final outputs of the entire graphics pipeline process. During this process, the shader programs of the respective graphics operation use one or more static data items in addition to the received user inputs and outputs from the preceding graphics operation. For example, the static data items used in a graphics operation of the OpenGL rendering pipeline include one or more texture objects, a vertex data buffer object, and a constant data object. The graphics pipeline process renders a sequence of image frames for each online gaming session, and each image frame includes an array of pixels (also called a page) having a resolution. In some implementations, a static data item corresponding to the graphics pipeline process (e.g., a texture object) includes one or more images having the same resolution as the image frames of the online gaming sessions.

The static data items are shared in the graphics pipeline process of multiple online gaming sessions corresponding to the gaming title, i.e., does not change among different online gaming sessions. In some situations, the static data items are stored in part of a random-access memory (GPU RAM) associated with each individual GPU 140. This part of the GPU RAM is explicitly labeled by an application programming interface (API) as "read-only." In some situations, the GPU RAM is a DRAM (e.g., the main dynamic memory 144) that spends a significant part of its power budget on memory refresh. Given the existence of memory technologies that do not require refresh cycles, it is a less desirable solution to use the GPU RAM to store the static data items.

In some implementations, a fraction of the GPU's DRAM (e.g., part of the main dynamic memory) is replaced with a non-volatile memory that does not require refreshes and uses less power than a DRAM. This non-volatile memory is used to store read-only assets (i.e., a subset or all of the static data items) used in the graphics pipeline process. Examples of such a non-volatile memory includes a PRAM, a flash memory and a solid-state drive. In some implementations, when the PRAM is used, it can handle orders of magnitude fewer write cycles than the DRAM. Thus, in some implementations, the PRAM uses wear-leveling and hash-allocation. Each page in the PRAM has an associated hash indicating the stored contents, and reads and writes into the PRAM are indexed in this hash (using page table translation). When a game application corresponding to a gaming title releases its "read only" assets (e.g., a static data item), the memory controller 204 does not immediately release pages corresponding to the read-only assets, but only releases the pages corresponding to the read-only assets if the PRAM is full. When released, the pages corresponding to the read-only assets are discarded according to a least recently used (LRU) method. As such, memory units in the PRAM approximately run the same amount of workload (e.g., provide the same amount of accesses for the same gaming title over again), and are protected from excessive writes that can permanently damage the memory units.

In some implementations of cloud-based gaming applications (e.g., in the server system 114), after a fraction of the GPU's DRAM (e.g., part of the main dynamic memory 144) is replaced with a non-volatile memory, each GPU's DRAM is reduced down to what is needed for read/write the RAM. The non-volatile memory of each GPU 140 is consolidated with the non-volatile memories of other GPUs to form a centralized static memory pool 202 (e.g., a PRAM storage device) and shared among these GPUs 140. In some implementations, accesses are routed over a fast in-rack interconnect to the static memory pool 202, and the fast in-rack interconnect includes a bus arranged on each server rack or on a similar scale. Also, memory lookup tables or hashes are stored in the static memory pool 202.

The read-only portions of GPU assets can be re-used across multiple runs, and can be shared if many of the workloads attached to the centralized read-only storage are similar. That said, in some implementations, the static data items stored in the static memory pool 202, if extracted, are reused among two or more online gaming sessions. On write into this static memory pool 202, the static data items are hashed according to a memory lookup table or hash to avoid storing the same static data items repeatedly. In some implementations, if a static data item already exists in the static memory pool 202, an augmented LRU policy is applied to avoid the static memory pool 202 from being completely filled. In some implementations, an offset is retrieved for the existing data item in the static memory pool 202 and saved for future memory accesses to this static data item. When a game application releases the static data item, there is no need to erase it until the static memory pool 202 runs out of space.

In some implementations, a latency is measured for a round trip from each GPU 140 to the static memory pool 202, and compensated using one or more GPU latency-hiding methods. The one or more GPU latency-hiding methods include, but are not limited to, write consolidation that combines write accesses to the static memory pool 202, tiled/compressed/spatially coherent textures, and page-sized transfers from the static memory pool 202. Under some circumstances, a number of warps is increased to hide memory latencies because of using the static memory pool 202 (rather than local DRAM) for storing static data items.

In some implementations, the centralized static memory pool 202 includes PRAM and PRAM-like memory that often has limited write cycles. The static memory pool 202 is swapped out or replaced while none of the GPUs 140 would be impacted in the rack.

In some implementations, the server system 114 supports online gaming sessions for more than one gaming titles. Workloads are assigned to a rack including multiple servers according to previous workloads uploaded "read only" assets to the static memory pool 202. The gaming titles are split by level, and the same levels of popular gaming titles are run by the game servers 118 on the same rack to allow smaller static memory pools.

In some implementations, the static memory pool 202 can be replaced with a shared DRAM pool (instead of a PRAM pool or equivalent), provided that a large number of GPUs are running the same workloads (e.g., online gaming sessions corresponding to a gaming title) and can achieve a sufficiently re-use to amortize the DRAM refresh and network power costs.

Figure 3A:
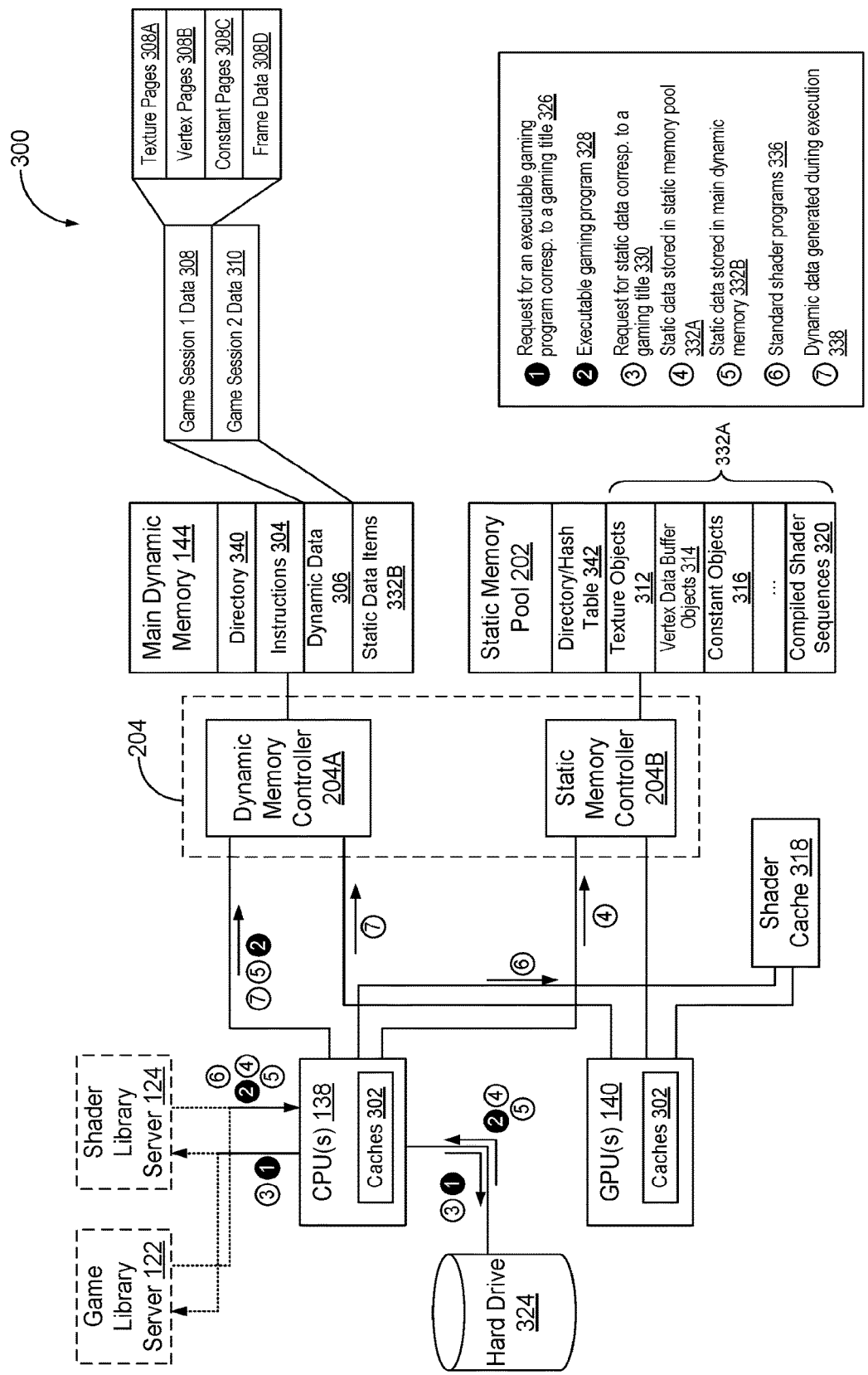
FIG. 3A is an example memory system configured to store data in a server system in accordance with some implementations.

FIG. 3A is an example memory system 300 having a multilevel storage scheme that is configured to store data in a server system 114 in accordance with some implementations. In accordance with the multilevel storage scheme, the memory system 300 of the server system 114 includes a plurality of caches 302 that is disposed directly within each individual server (e.g., a game server 118). More specifically, each of the plurality of caches 302 is directly associated with a processor of an individual server, e.g., a CPU 138 and a GPU 140 of a game server 118, and configured to provide both instructions that are executed by the processor of the individual server and data that are used during execution of the instructions. The memory system 300 of the server system 114 further includes a main dynamic memory 144 that is configured to store programs executed by one or more processors of a server (e.g., game server 118) and data used during execution of the programs. Each program includes a plurality of instructions, and during execution, the instructions are sequentially loaded to the caches 302 of a corresponding processor and wait to be executed by the respective processor. In some implementations, a subset of or all servers of the server system 114 share a main dynamic memory 144. A data bus couples the subset of or all servers of the server system 114 to the main dynamic memory 144 to enable write and read accesses to the main dynamic memory 144. Optionally, the data bus includes a high speed data bus via which the main dynamic memory 144 is accessed with a substantially small latency less than a threshold bus latency. In some implementations, each server of the server system 114 has a respective main dynamic memory 144 accessible only to one or more processors of the respective server. For example, a game server 118 includes a main dynamic memory 144 accessible to both the CPU 138 and the GPU 140 of the game server 118. The main dynamic memory 144 of the game server 118 stores instructions 304 configured to execute one or more gaming titles, e.g., those of a server-side game module 526 in FIG. 5A, and dynamic data 306 associated with online gaming sessions of each gaming title, e.g., first game session data 308 and second game session data 310. Specifically, the first game session data 308 optionally include texture pages 308A, vertex pages 308B, constant pages 308C and frame data 308D of one or more image frames generated by the GPU 140 for a corresponding online gaming session of the respective gaming title. More details on programs and data stored in the main dynamic memory 144 in the server system 114 are explained below with reference to FIGS. 5A and 5B.

In accordance with the multilevel storage scheme, the memory system 300 of the server system 114 further includes a static memory pool 202 that is centralized for and shared by a plurality of game servers 118 in the server system 114. The static memory pool 202 is configures to store one or more static data items used to render image frames of online gaming sessions of a gaming title. Examples of the one or more static data items include, but are not limited to, texture objects 312, vertex data buffer objects 314, constant data objects 316. When the plurality of game servers 118 are assigned to execute a plurality of online gaming sessions, each game server 118 obtains one or more static data items from the static memory pool 202, and one or more dynamic data items 306 from its corresponding main dynamic memory 144.

Further, in some implementations, a game server 118 further includes a shader cache 318 coupled to its GPU 140. The shader cache 318 is configured to store at least one sequence of compiled shaders such that instructions of the compile shaders can be directly loaded to the GPU 140 to render gaming content via a graphics pipeline process. In some implementations, the server system 114 includes a plurality of compiled shader sequences 320 each of which is configured according to a performance criterion, and each compiled shader sequence 320 optionally includes a plurality of versions corresponding to different user input conditions. Optionally, the plurality of compiled shader sequences 320 are stored in the shader cache 318. Optionally, the plurality of compiled shader sequences 320 are stored in the static memory pool 202, and moved to the shader cache 318 or directly to a cache of the GPU 140 if selected for use in gaming content rendering.

Further, in accordance with the multilevel storage scheme, the memory system 300 of the server system 114 includes a hard drive 324 that stores one or more executable gaming programs corresponding to one or more gaming titles. During the course of configuring the server system 114 to host a gaming title, the CPUs 138 of the server system sends a program request 326 for an executable gaming program 328 corresponding to the gaming title. In response to the program request 326, the hard drive 324 returns the executable gaming program 328 corresponding to the gaming title to the CPUs 138. In some implementations, the hard drive 324 does not store the requested executable gaming program 328, and the CPUs 138 send the program request 326 to request the executable gaming program 328 from a remoter server (e.g., a game library server 122 or another third party game provider). The CPUs 138 store the executable gaming program 328, returned from the hard drive 324 or the remote server, into the main dynamic memory 144 as a server-side game module 526.

Further, in some implementations, the hard drive 324 also stores static data items of one or more gaming titles. During the course of loading a gaming title, the CPUs 138 of the server system sends a data request 330 for the static data items of the gaming title. In response to the data request 326, the hard drive 324 returns a subset or all of the static data items 332 corresponding to the gaming title to the CPUs 138. In some implementations, the hard drive 324 does not store a specific static data item, and the CPUs 138 send a data request 330 to request the specific static data item from a remoter server (e.g., a game library server 122 or a shader library server 124). One or more static data items 332A returned from the hard drive 324 or the remote server are stored in the static memory pool 202. Alternatively, in some implementations, one or more static data items 332B are stored in the main dynamic memory 144 for direct access by the CPUs and GPUs of the game servers 118.

Additionally, the CPUs 138 also send a shader request to the shader library server to obtain one or more standard shader programs 336 used in association with the gaming title, and the returned shader programs 336 are stored locally in the shader cache 318. While executing online gaming sessions corresponding to the gaming title, the CPUs 138 and GPUs 140 generate a plurality of dynamic data items 338. These plurality of dynamic data items 338 are stored into the main dynamic memory 144 of the server system 114.

In some implementations, the server system 114 includes a dynamic memory controller 204A and a static memory controller 204B that are configured to manage write and read accesses to the main dynamic memory 144 and the static memory pool 202, respectively. In some implementations, the server system 114 includes a single memory controller 204 configured to manage write and read accesses to the main dynamic memory 144 and the static memory pool 202. The main dynamic memory 144 includes a directory 340 that identifies locations of the instructions 304, dynamic data items 306 and static data items 332B (if any) in the main dynamic memory 144. In some implementations, the static memory pool 202 includes a hash table 342 that identifies locations of the static data items 332A in the static memory pool 202. Optionally, the static data items 332 are identified based on context information. In an example, the static memory pool 202 stores a plurality of compiled shader sequences 320, and their addresses in the static memory pool 202 are identified using performance criteria, user inputs and/or usage statistics of a corresponding graphics pipeline process in the hash table. Optionally, such context based mapping in the hash table 342 is applied to other static data items as well. The hash table protects the static memory pool 202 from storing a static data item repeatedly in association with different situations, thereby causing a waste of its memory resources.

Figure 3B:
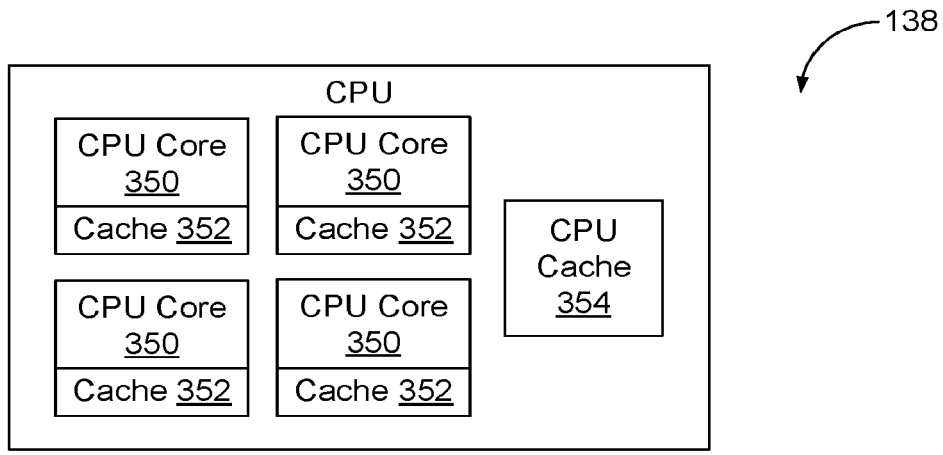
FIG. 3B is an example central processing unit (CPU) having multiple levels of caches in accordance with some implementations.

FIG. 3B is an example CPU 138 having multiple levels of caches in accordance with some implementations. In some implementations, each CPU includes a plurality of CPU cores 350. Each CPU core 350 has a cache 352 storing both instructions executed by the respective CPU core and data used during execution of the instructions. The cache 352 is directly coupled with the respective CPU core 350 and can provide the instructions and data immediately and directly to the respective CPU core 350. In some implementations, the CPU core 350 further includes a CPU cache 354 that is shared by the plurality of CPU cores 350 of the CPU 138. The CPU cache 354 stores data that are used during execution of the instructions stored in the CPU cores 350. The CPU cache 354 feeds its data to the caches 352 directly coupled with the CPU cores 350.

Figure 3C:
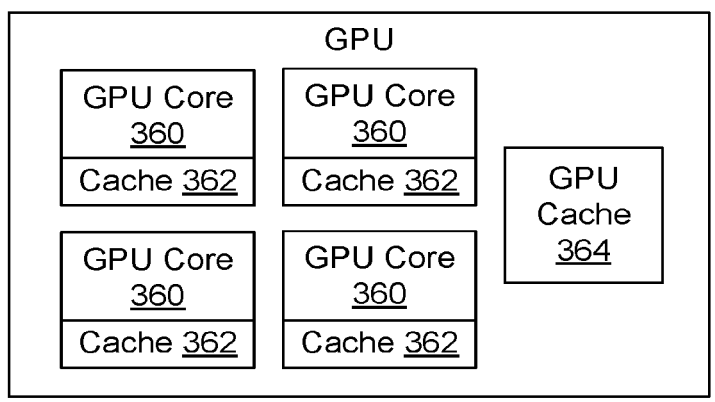
FIG. 3C is an example graphics processing unit (GPU) having multiple levels of caches in accordance with some implementations.

FIG. 3C is an example GPU 140 having multiple levels of caches in accordance with some implementations. In some implementations, each GPU includes a plurality of GPU cores 360. Each GPU core 360 has a cache 360 storing both instructions executed by the respective GPU core and data used during execution of the instructions. The cache 362 is directly coupled with the respective GPU core 360 and can provide the instructions and data immediately and directly to the respective GPU core 362. In some implementations, the GPU core 360 further includes a GPU cache 364 that is shared by the plurality of GPU cores 360 of the GPU 138. The GPU cache 364 stores data that are used during execution of the instructions stored in the GPU cores 360. The GPU cache 364 feeds its data to the caches 362 directly coupled with the GPU cores 360. To render gaming content of a gaming title writes and reads in the memory system 300 are managed by page (i.e., by an array of image pixels corresponding to an image frame of gaming content). Page-sized reads are cached in the local GPU memory hierarchy (L3-L1 caches), possibly including a small pool of DRAM used as a last-level cache, i.e., cached in the caches 362 and GPU cache 364.

Figure 3D:
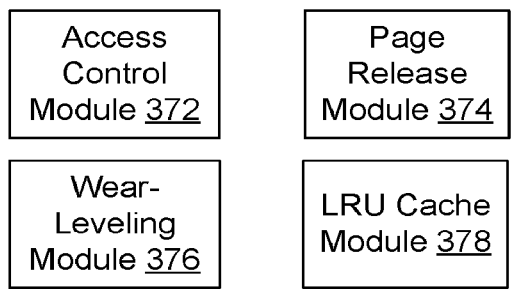
FIG. 3D is an example memory controller that controls read and write accesses to a static memory pool shared by multiple processors in a server system in accordance with some implementations.

FIG. 3D is an example memory controller 204 that controls read and write accesses to a static memory pool 202 shared by a plurality of processors in a server system 114 in accordance with some implementations. The memory controller 204 includes one or more of an access control module 372, a page release module 374, a wear-leveling module 376 and a LRU module 378. The access control module 372 is configured to access the static memory pool 202 based on a hash table 342 stored therein. The page release module 374 is configured to delete static data items from the static memory pool 202. Optionally, in response to a request to delete a specific data item, the page release module 374 determines whether the static memory pool 202 is full. In accordance with a determination that the static memory pool 202 is not full, the page release module 374 modifies the hash table 342 to disable any access to the specific data item to be deleted. In accordance with a determination that the static memory pool 202 is full, the page release module 374 deletes the specific data item from the static memory pool 202 to free corresponding memory space.

The wear-level module 376 is configured to monitor re-writes of memory units in the static memory pool 202 and distribute re-writes evenly in the static memory pool 202 for the purposes of prolonging service life of the static memory pool 202. The LRU module 378 is configured to remove the static data item that is the least recently used from the static memory pool 202. Specifically, in some implementations, the LRU module 378 stores age bits with each static data item stored in the static memory pool 202. When the memory limit has been reached, static data items that have been accessed less recently are removed starting from the oldest data item identified according to the age bits. When the LRU module deletes a static data item, the age bits change for the static data items that remain in the static memory pool 202.

Figure 4A:
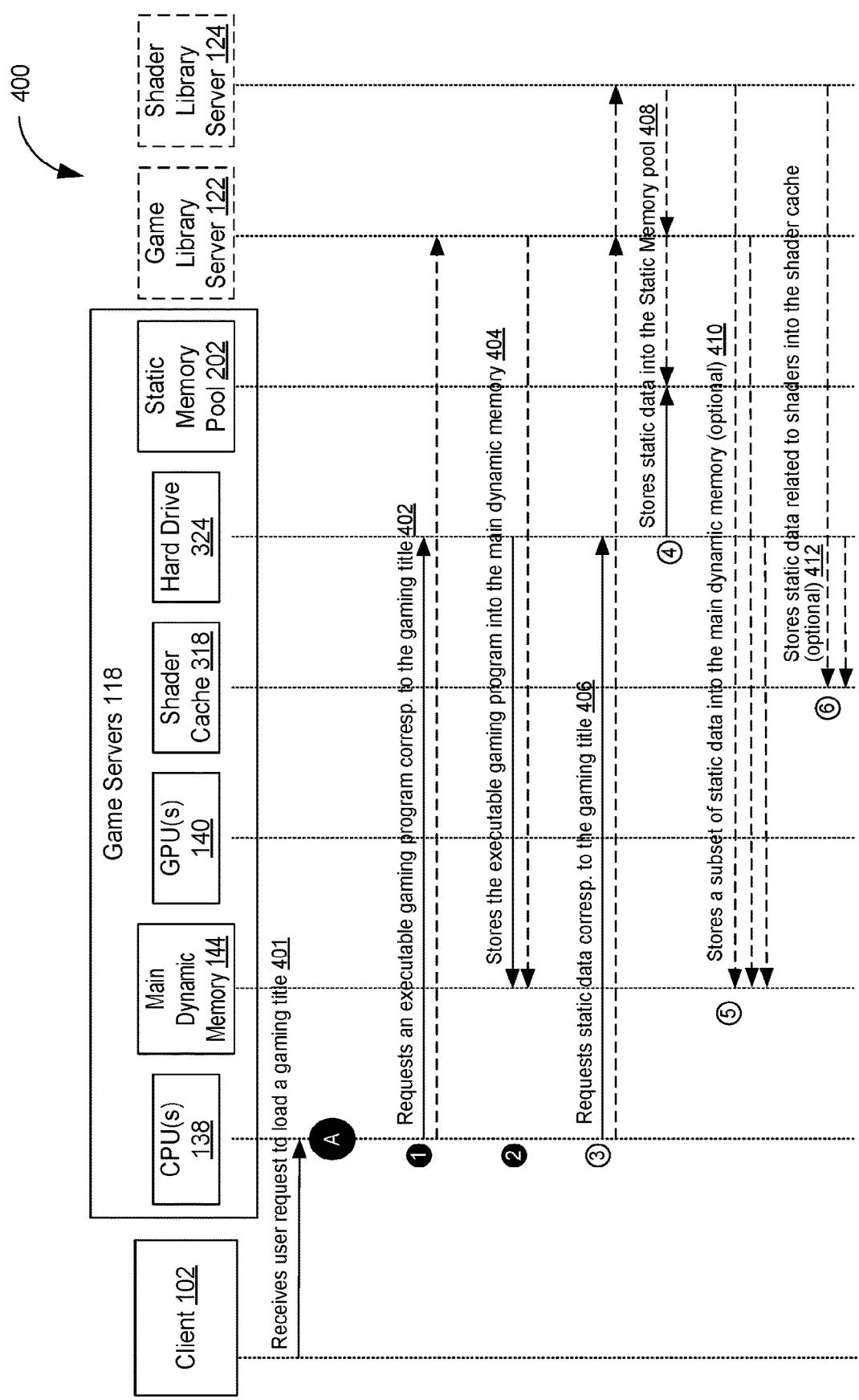
FIG. 4A is an example data flow during a process of loading a gaming title on a server system in accordance with some implementations.

FIG. 4A is an example data flow during a process 400 of loading a gaming title on a server system 114 in accordance with some implementations. The server system 114 includes game servers 118, a game library server 122 and a shader library server 124 that are remote from each other. The server system 114 is also remote from a plurality of client devices 102 that are engaged in gameplay of a gaming title hosted by the game severs 118. The server system 114 (specifically, the game servers 118) includes one or more CPUs 138 and a plurality of GPUs 140, and employs a multilevel storage scheme. In accordance with the multilevel storage scheme, the server system 114 includes main dynamic memory 144 storing programs and data for use by the CPUs and/or GPUs during program execution, a static memory pool 202 stored in a non-volatile memory, and a memory controller 204 configured to manage the static memory pool 202. In response to receiving (401) a user request to load a gaming title, the CPUs 138 send (402) a program request to a hard drive 324 of the game server 118 or a game library server 122, requesting an executable gaming program (e.g., a server-side game module 526) corresponding to the gaming title. In some implementations, the CPUs 138 send the program request to the hard drive 324 first. The CPUs 138 send the program request to the game library server 122 if the hard drive 324 cannot provide a copy of the executable gaming program. In response to the program request, the hard drive 324 or a game library server 122 returns the copy of the executable gaming program, which is then stored (404) in the main dynamic memory 144.

One or more static data items (e.g., texture objects) are required during the course of executing the executable gaming program, so the CPUs 138 sends (406) a data request to at least one of the hard drive 324, the game library server 122 and the shader library server 124, requesting a predetermined set of static data items. The CPUs 138 sends the data request according to an order, e.g., first to the hard drive 324, then to the game library server 122 and/or the shader library server 124 if the hard drive 324 does not have the respective data item. The order is optionally identical for the set of static data items or customized according each static data item. For each of a first subset of the requested static data items, one of the hard drive 324, the game library server 122 and the shader library server 124 returns a copy of the respective data item, which is stored (408) in the static memory pool 202. In some implementations, a second subset of the requested static data items is returned and stored (410) in the main dynamic memory 144. In some implementations, the requested static data items include a third subset of the requested data items (e.g., one or more shader programs). The third subset of the requested static data items is returned by one of the hard drive 324 and the shader library server 124, and stored (412) in the shader cache 318.

Figure 4B:
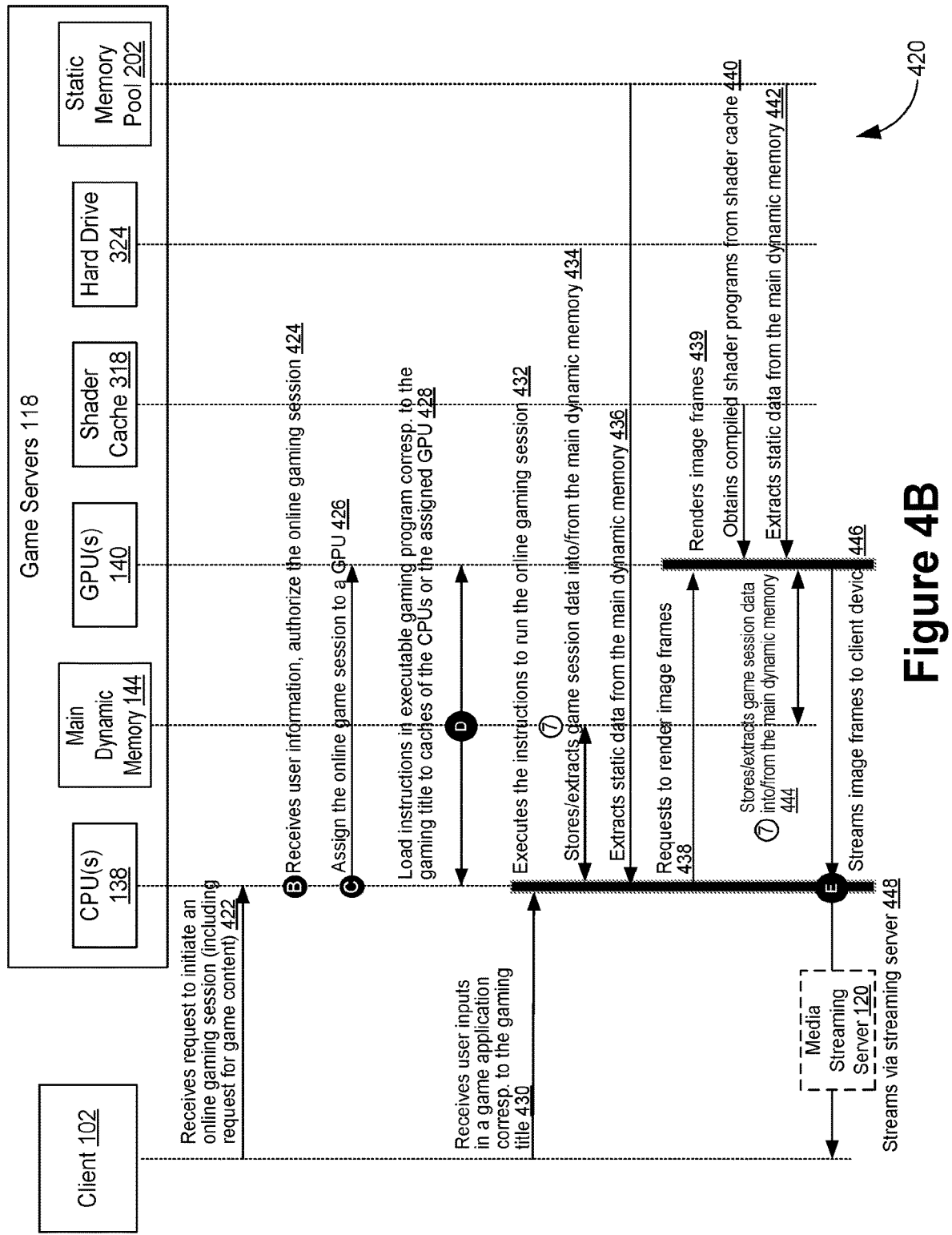
FIG. 4B is an example data flow during a process of executing an online gaming session on a server system in accordance with some implementations.

FIG. 4B is an example data flow 420 during a process of executing an online gaming session on a server system 114 (specifically, in a game server 118) in accordance with some implementations. The CPUs receives (422) a plurality of session requests to initiate a plurality of online gaming sessions under a gaming title from a plurality of distributed client devices 102. Each client device 102 executes a real time user-interactive gaming application corresponding to the gaming title, and a respective session request is sent from the gaming application of the respective client device 102. The respective session request includes user information of the requesting client device 102. After receiving the user information of the respective client device 102, the CPUs 138 authorize (424) a corresponding online gaming session based on the user information, and allocate (426) one of the GPUs 140 to execute the corresponding online gaming session. In some implementations, two or more of the plurality of online gaming sessions are allocated to the one of the GPUs 140. Stated another way, the two or more online gaming sessions have to share computational and storage resources of the one of the GPUs based on time-division multiplexing (TDM), spatial multiplexing or a combination thereof. More details of GPU allocation in game content rendering are explained in U.S. Provisional Patent Application No. 62/646,824, titled "Methods and Systems for Rendering and Encoding Content for Online Interactive Gaming Sessions," filed on Mar. 22, 2018, which is incorporated by reference herein in its entirety.

In response to each session request, the CPUs 138 copies (428) instructions of the executable gaming program of the gaming title from the main dynamic memory 144 to the local caches of the CPUs 138, and executes the instructions one by one. Likewise, if instructed by the CPUs 138, the respective GPU assigned to execute the respective online gaming session also loads (428) related game rendering instructions in the executable gaming program to its local caches, and executes the game rendering instructions one by one.

In some implementations, each of the plurality of online gaming sessions is constantly refreshed, e.g., at a rate of 60 frames per second (fps). In some implementations, each of the plurality of online gaming sessions is refreshed in response to a user action inputted by the respective session itself or by a related session. For example, a subset of online gaming sessions are related when they are in the same gaming scene of the gaming title, and gaming content delivered to each of the subset of online gaming sessions is updated at least when any one of the subset of online gaming sessions inputs a user action.

Specifically, for an online gaming session, the CPUs 138 receives (430) a user input entered via a gaming application of a first client device that is engaged in the online gaming session or another distinct gaming session sharing the same gaming scene with the online gaming session. In response, the CPUs 138 execute (432) the instructions of the executable gaming program corresponding to the gaming title to instruct (438) a GPU 140 assigned to execute the online gaming session to render a sequence of image frames according to the user input. During execution of this online gaming session, dynamic data items associated with this online gaming session are stored into or extracted from (434) the main dynamic memory 144. Static data items associated with this online gaming session are extracted (436) from the static memory pool 202. In some implementations (not shown herein), a set of static data items are extracted from the main dynamic memory 144.

The assigned GPU 140 then executes (439) game rendering instructions to render the image frames of the online gaming session based on the user input. During execution of the online gaming session, the GPU 140 obtains (440) compiled shaders from the shader cache 318, extracts (442) static data items from the static memory pool 202, and stores into or extracts from (444) the main dynamic memory 144 dynamic data items. In some implementations (not shown herein), the GPUs also extracts one or more static data items from the main dynamic memory 144. The image frames rendered by the GPU are encoded by the encoder 142, and streamed (446) to the client device 102 executing the online gaming session. In some implementations, the image frames rendered by the GPU (e.g., a normal latency stream intended for spectator review) are streamed (448) to the client device 102 via a media streaming server 120.

Figure 4C:
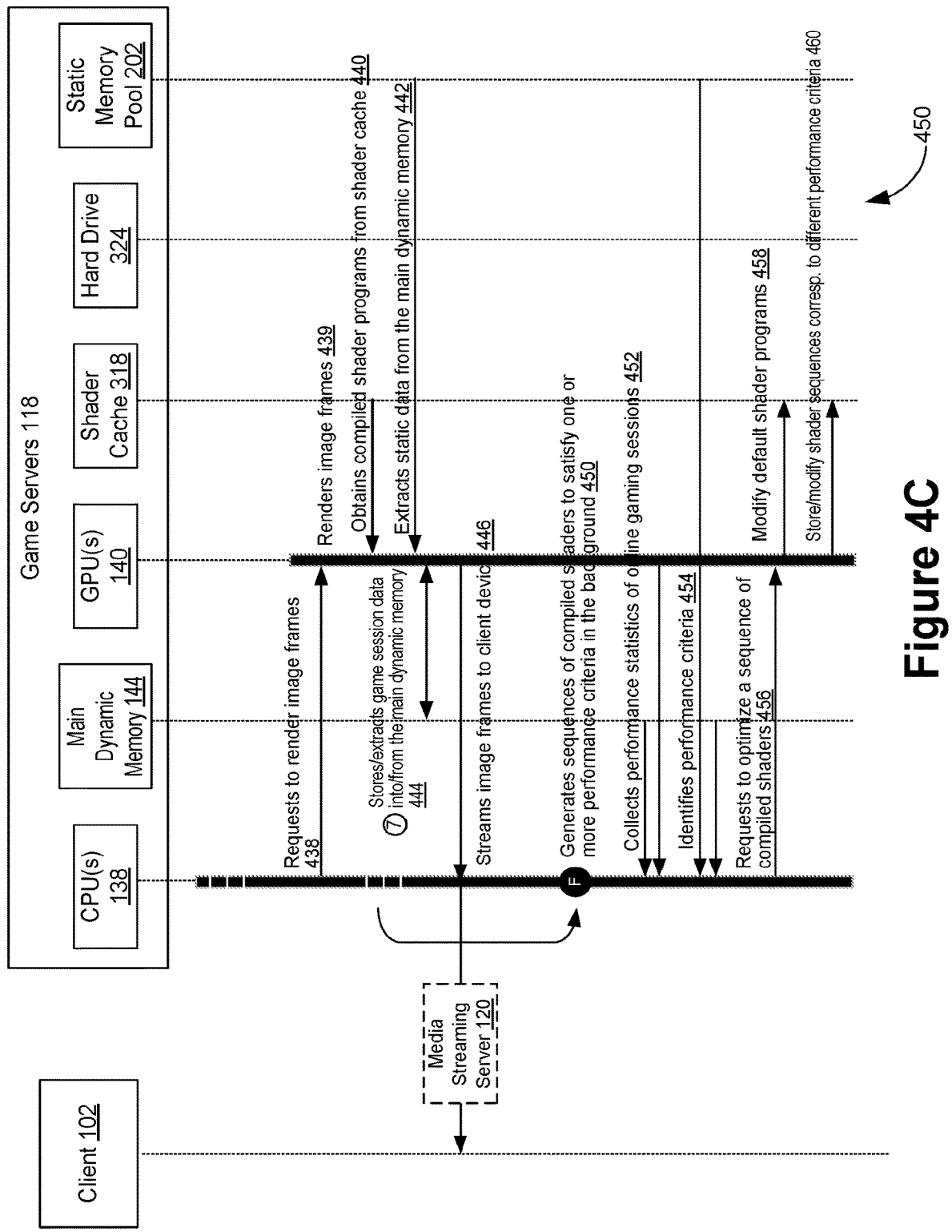
FIG. 4C is an example data flow during a shader optimization process in accordance with some implementations.

FIG. 4C is an example data flow in a shader optimization process 450 in accordance with some implementations. In some implementations, the executable gaming program (e.g., a server-side game module 526 in FIG. 5A) includes a game application and a shader pipeline optimizer that configured to execute an online gaming session and a shader pipeline optimization process concurrently. For example, while the game application executes the online gaming session in a graphics pipeline process (operations 438-448) in the foreground, the shader pipeline optimizer optimizes compiled shaders used in this graphics pipeline process in the background. Stated another way, while the graphics pipeline process (operations 438-448) is running, the game server 118 generates (450) one or more sequences of compiled shaders in the background to satisfy one or more performance criteria.

Specifically, in some implementations, the CPUs 138 collect (452) usage statistics of a set of online gaming sessions that is optionally sampled from all active online gaming sessions related to the gaming title. The usage statistics may be obtained from the local caches of the CPUs 138 and GPUs 140 or the main dynamic memory 144. The CPUs 138 identifies and obtains (454) one or more performance criteria that need to be satisfied during optimization. In some implementations, the one or more performance criteria include one or more static data items that are stored in the static memory pool 202 or the main dynamic memory 144 (optional). The CPUs 138 then send (456) a request to the GPUs to optimize a sequence of compiled shaders that is being used to execute the active online gaming sessions based on the usage statistics and the performance criterion. For each of the one or more performance criteria, the GPUs 140 modifies (458) one or more shaders in the sequence of compiled shaders to improve performance of the sequence of compiled shaders with respect to the respective performance criterion, thereby creating a modified sequence of compiled shaders. In some situations, the modified sequence of compiled shaders is optionally stored in place of the sequence of compiled shaders and used by subsequent online gaming sessions. In some situations, the modified sequence of compiled shaders is stored as a new version of the sequence of compiled shaders corresponding to the usage statistics, and is used when subsequent game states of the online gaming sessions are consistent with the usage statistics. In some implementations, each modified sequence of compiled shaders is stored (460) in the shader cache 318 in association with a corresponding performance criterion. Alternatively, in some implementations not shown FIG. 4C, the associated modified sequence of compiled shaders and performance criterion are stored in the static memory pool 202.

Figure 4D:
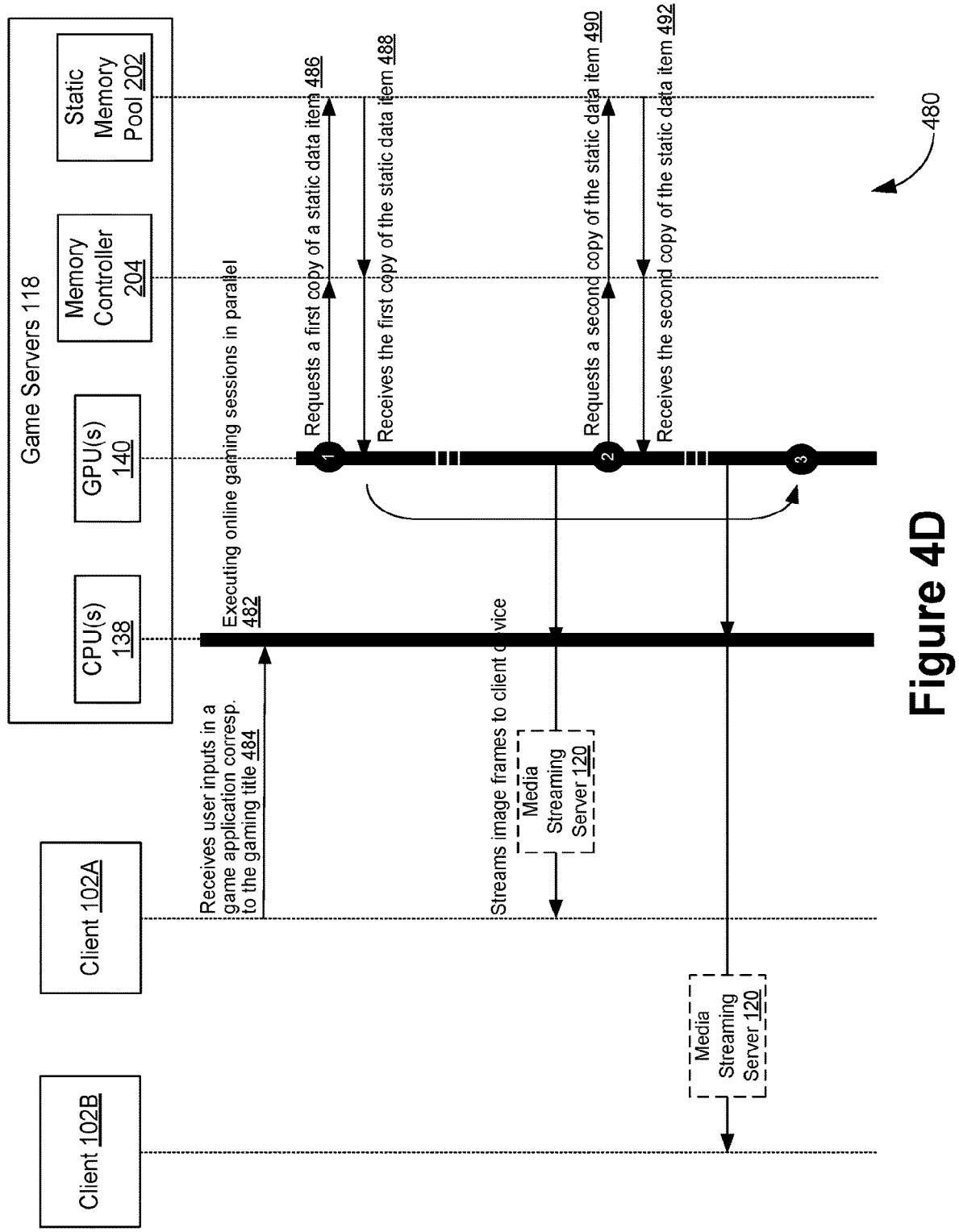
FIG. 4D is an example data flow of static data times when a plurality of online gaming sessions are being executed in accordance with some implementations.

FIG. 4D is an example data flow 480 to obtain static data items when a plurality of online gaming sessions are being executed in accordance with some implementations. As explained above, when a plurality of online gaming sessions are executed (482) in parallel by the game server 118, the one or more CPUs assigns each online gaming session to a respective GPU. During execution of each online gaming session, the respective GPU 140 obtains (440) compiled shaders from the shader cache 318, extracts (442) static data items from the static memory pool 202, and stores into or extracts from (444) the main dynamic memory dynamic data items. Referring to FIG. 4D, in some implementations, two client devices 102A and 102B execute a first one and a second one of the plurality of online gaming sessions, respectively. Both client devices 102A and 102B receives image frames rendered by the game servers 118, e.g., in response to receiving (484) user inputs in a game application corresponding to the gaming title by the client device 102A. During the course of rendering the respective image frames, each of the plurality of gaming sessions (including the first one and the second one) is associated with a static data item and requires a graphics operation executable by a respective GPU using the static data item, and the static data item is stored in the static memory pool 202.

For the first one of the plurality of gaming sessions, the CPUs assign the graphics operation to a first GPU. The first GPU requests (486) by the first GPU a first copy of the static data item from the memory controller 204, and receives (488) from the memory controller 204 the first copy of the static data item read from the static memory pool 202. Then, the first GPU performs the graphics operation using the first copy of the static data item, and stores locally a first result of the graphics operation in association with the first one of the plurality of gaming sessions (e.g., by using an identifier). Likewise, for the second one of the plurality of gaming sessions, the CPUs assign the graphics operation to a second GPU. The second GPU requests (490) a second copy of the static data item from the memory controller 204, and receives (492) from the memory controller 204 the second copy of the static data item read from the static memory pool 202. The second GPU performs the graphics operation using the second copy of the static data item, and stores locally a second result of the graphics operation in association with the second one of the plurality of gaming sessions.

In some implementations, for a third one of the plurality of online gaming session, the CPUs assign the graphics operation to a third GPU. The third GPU determines that the first GPU has requested the first copy of the static data item within a predefined period of time. The third GPU obtains the first copy of the static data item from the first GPU directly. In some implementations, the first GPU itself has not received the first copy from the memory controller yet, and the third GPU waits to obtain the first copy from the first GPU after the first GPU receives the first copy. Stated another way, the first and third GPUs consolidate their requests for the copy of the static data item.

In some implementations, each of the plurality of gaming sessions is associated with a priority, and the first and second GPUs receive from the memory controller a copy of the static data item read from the static memory pool 202 in accordance with the priorities of the first and second gaming sessions. For example, the first gaming session has a higher priority than the second gaming session. When the first GPU requests the first copy simultaneously with or within a threshold duration of time after the second GPU requests the second copy, the second GPU is suspended from receiving the second copy until the first GPU has received the first copy from the memory controller 204.

Server System, Client Devices, Game Controller and Media Devices

Figure 5A:
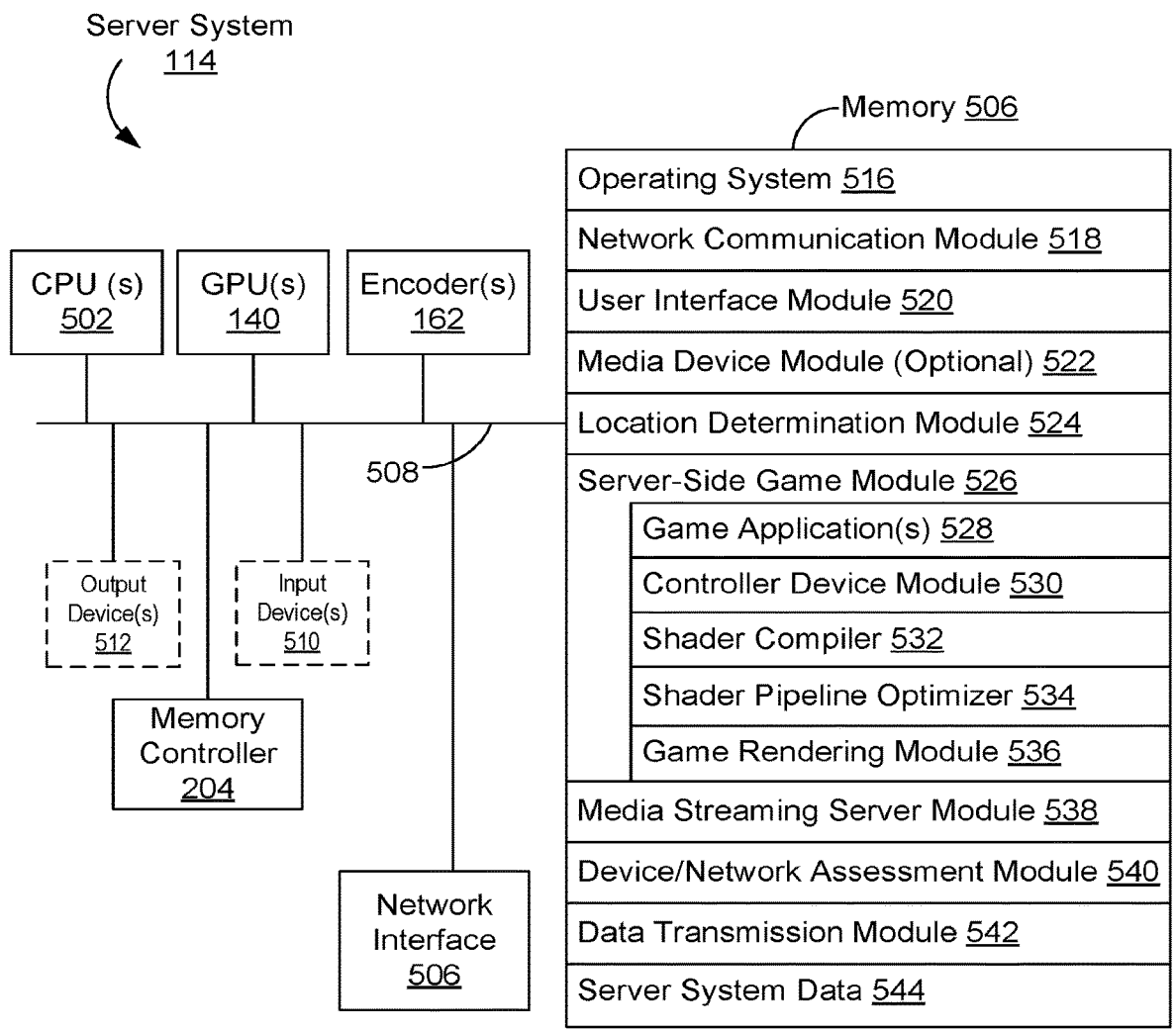
FIG. 5A is a block diagram illustrating an example server system in accordance with some implementations.
Figure 5B:
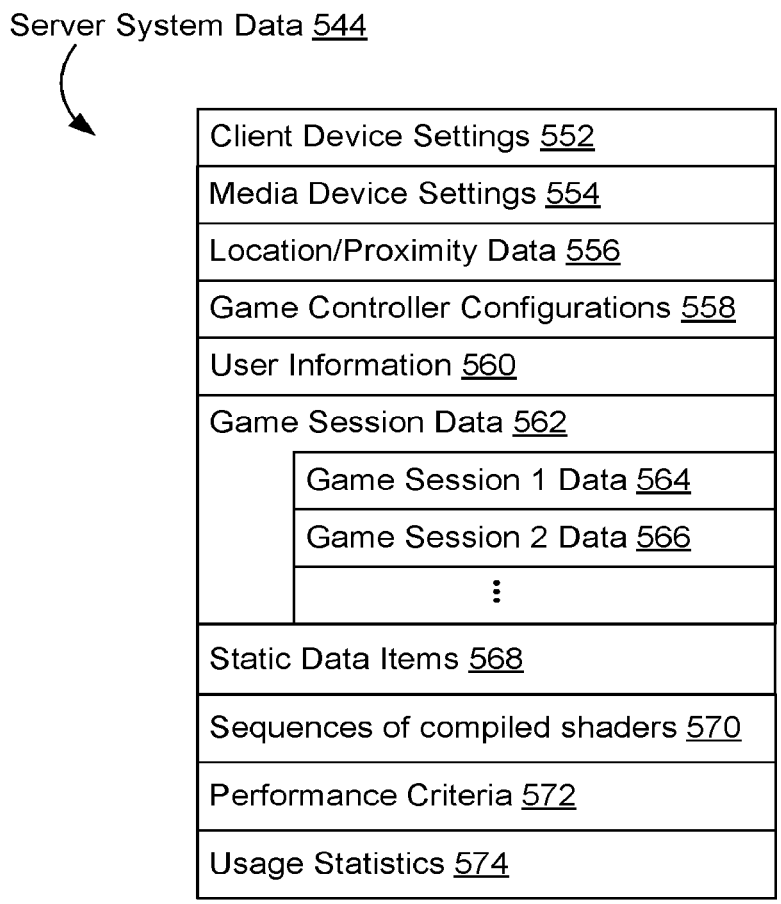
FIG. 5B is a block diagram illustrating data stored in the server system in accordance with some implementations.

FIG. 5A is a block diagram illustrating a server system 114 in accordance with some implementations. FIG. 5B is a block diagram illustrating data stored in the server 500 in accordance with some implementations. The server system 114, typically, includes one or more processing units (e.g., CPU(s) 18, GPU(s) 140 and encoder 142), one or more network interfaces 504, memory 506, and one or more communication buses 508 for interconnecting these components (sometimes called a chipset). The server system 114 may optionally include one or more input devices 510 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 512 that enable presentation of user interfaces and display content, including one or more speakers and/or one or more visual displays.

Memory 506 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units. Memory 506, or alternatively the non-volatile memory within memory 506, includes a non-transitory computer readable storage medium. In some implementations, memory 506 includes a subset or all of a main dynamic memory 144, a static memory pool 202 and a shader cache 318. In some implementations, memory 506, or the non-transitory computer readable storage medium of memory 506, stores the following programs, modules, and data structures, or a subset or superset thereof:

- Operating system 516 including procedures for handling various basic system services and for performing hardware dependent tasks;
- Network communication module 518 for connecting the server 500 (e.g., a game server 118) to other devices (e.g., other servers in the server system 114, the client device 102 and/or 104, and the media device 106) via one or more network interfaces 504 (wired or wireless) and one or more communication networks 112, such as the Internet, other wide area networks, local area networks, metropolitan area networks, and so on;
- User interface module 520 for enabling presentation of information (e.g., a graphical user interface for presenting application(s), widgets, websites and web pages thereof, and/or games, audio and/or video content, text, etc.) at the client device 102 and/or 104;
- Media device module 522 (optional) that is executed to provide server-side functionalities for device provisioning, device control, and user account management associated with media device(s) 106;
- Location determination module 524 for determining the location of the client device 102 and/or 104 based on location information of any of the client device (102 and/or 104) and the media device 106;
- Server-side game module 526 for providing server-side functionalities associated with one or more gaming titles, including but not limited to setting up game sessions, storing session state data and other game-related data, processing gameplay inputs from the client devices 102, and rendering gameplay outputs (e.g., sequences of image frames) in response to the gameplay inputs;
- Media streaming server module 538 for hosting a media streaming site, receiving concurrent ancillary or supplemental media streams associated with an online gaming session, and providing the concurrent media streams to a client device 104 for concurrent display with the online gaming session that is being executed on the game applications 629 of the same client device 104 or a distinct client device 102;
- Device/network assessment module 540 for assessing device and network capabilities of client device 102 and/or 104, including but not limited to assessing network bandwidth of the connection to the client device 102/104 and assessing whether the client device 102/104 has the needed module or application to play a game;

Data transmission module 542 for providing data (e.g., game controller configurations 556), software updates, etc.) to client devices 102/104; and Server system data 544 including:
  Client device settings 552 for storing information associated with the client devices 102 and 104, including common device settings (e.g., service tier, device model, storage capacity, processing capabilities, communication capabilities, etc.);
  Media device settings 554 (optional) for storing information associated with user accounts of the media device module 522, including one or more of account access information and information for device settings (e.g., service tier, device model, storage capacity, processing capabilities, communication capabilities, etc.);
  Location/proximity data 556 including information associated with the presence, proximity or location of any of the client device 102, the reviewer client device 104 and the media device 106;
  Game controller configurations 558 for storing controller configurations for various gaming titles; and
  User information 558 for storing information associated with user accounts of each of one or more gaming titles (e.g., game application 629, FIG. 6) that are hosted on the server system 114, including for example user account information (e.g., identification and passwords), membership type, preference, and activity history; and
  Game session data 560 for storing data associated with game sessions, including for example data 562 for a first game session and data 564 for a second game session, where the session data 560 for each game session includes, but is not limited to a frame rate, a rendering specification, a normal latency requirement, information of GPU allocation, information of encoder allocation, identifications of related sessions, latest status information, shader pipeline identification, texture pages 308A, vertex pages 308B, constant pages 308C, and frame data 308D of one or more image frames associated with the respective game session.
  Static data items 568 for storing data shared by a plurality of online gaming sessions, where the static data items 562 include, but are not limited to, one or more of texture objects, a vertex data buffer object, a constant data object, and sequences of compiled shaders that are optimized based on usage statistics to satisfy different performance criteria;
  Sequences of compiled shaders 570 for storing shaders that have been compiled and ready for execution in a graphics pipeline process, where the sequences of compiled shaders include, but are not limited to a default sequence of compiled shader that is used to render gaming content by default and multiple sequences of compiled shaders that are optimized based on usage statistics to satisfy different performance criteria; and
  Performance criteria 572 and usage statistics 574 that are stored in association with the sequences of compiled shaders that are optimized, wherein each of the performance criteria 572 corresponds to one or more of total power consumption, a code size, an average latency, total cache usage, and total memory usage of a sequence of compiled shaders during the course of executing a plurality of online gaming sessions, and the usage statistics 574 characterize execution of each of a plurality of online gaming sessions.

In some implementations, the server-side game module 526 includes the following programs, modules, or a subset or superset thereof:
  Game application(s) 528 for executing online gaming sessions corresponding to one or more gaming titles, including authorizing online gaming sessions, assigning a GPU to execute a subset of sessions, instructing the assigned GPU to execute corresponding sessions, and encoding image frames rendered by the assigned GPU;
  Controller device module 530 for interacting and controlling a specialized game controller device 102B, e.g., receiving user requests and inputs from the game controller device 102B;
  Shader compiler 532 for compiling shaders used in an ordered sequence of graphics operations of a graphics pipeline process that renders image frames for online gaming sessions corresponding to a gaming title;
  Shader pipeline optimizer 534 for modifying one or more shaders in a sequence of compiled shaders being used to execute online gaming sessions to improve performance of the sequence of compiled shaders with respect to a performance criterion;
  Game rendering module 536 for controlling the GPUs 140 during execution of online gaming sessions to render image frames using a sequence of default compiled shaders or a sequence of compiled shaders that are optimized.

In some implementations, the server system 114 further includes one or more memory controllers 204 that are interconnected to the CPUs, GPUs, the main dynamic memory 144 and the static memory pool 202 using one or more communication buses 508. The one or more memory controller 204 include a first memory controller 204A configured to manage the main dynamic memory 144 and a second memory controller 204B configured to manage the static memory pool 202. As shown above, elements 516-542 and 552-566 are stored in the main dynamic memory 144, and are accessible via the first memory controller 204A. Static data items 568 are stored in the static memory pool 202, and accessible via the second memory controller 204B. Compiled shaders 570, performance criteria 572 and usage statistics 574 are optionally stored together in the shader cache 318 or the static memory pool 202. Optionally, the usage statistics 574 that are collected for a specific set of online gaming sessions are stored as the game session data 562 in the main dynamic memory 144.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figure 6:
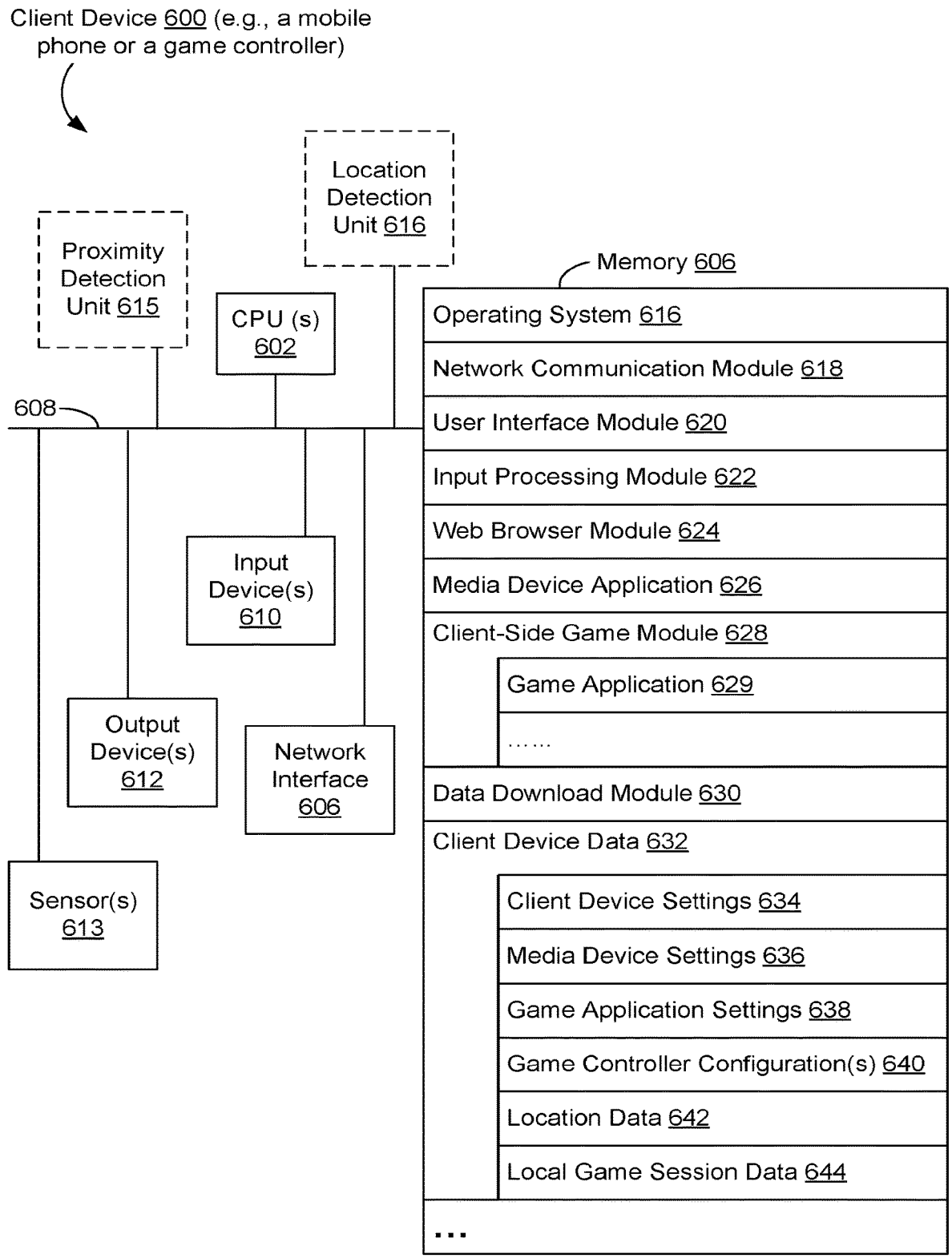
FIG. 6 is a block diagram illustrating an example client device (e.g., a mobile phone, a tablet computer, a laptop computer or a game controller) in accordance with some implementations.

FIG. 6 is a block diagram illustrating an example client device 600 (e.g., the client device 102 or 104) of the gaming environment 100 in accordance with some implementations. Examples of the client device 600 include, but are not limited to, a mobile phone, a tablet computer, a laptop computer, a desktop computer, and a wearable personal device. The client device 600 includes one or more processing units (CPUs) 602, one or more network interfaces 604, memory 606, and one or more communication buses 608 for interconnecting these components (sometimes called a chipset). The client device 600 includes one or more input devices 610 that facilitate user input, such as a keyboard, a mouse, a voice-command input unit or microphone, a touch screen display, a touch-sensitive input pad, a gesture capturing camera, or other input buttons or controls. Furthermore, some the client devices 600 use a microphone and voice recognition or a camera and gesture recognition to supplement or replace the keyboard. In some implementations, the client device 600 includes one or more cameras, scanners, or photo sensor units for capturing images, for example, of graphic series codes printed on electronic devices. The client device 600 also includes one or more output devices 612 that enable presentation of user interfaces and display content, including one or more speakers and/or one or more visual displays. Optionally, the client device 600 includes a location detection device 614, such as a GPS (global positioning satellite) or other geo-location receiver, for determining the location of the client device 600. The client device 600 may also include a proximity detection device 615, e.g., an IR sensor, for determining a proximity of a media device 106 and/or of player clients 104. The client device 600 may also include one or more sensors 613 (e.g., accelerometer, gyroscope, etc.) for sensing motion, orientation, and other parameters of the client device 600, which may be used as input.

Memory 606 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating system 616 including procedures for handling various basic system services and for performing hardware dependent tasks;
- Network communication module 618 for connecting the client device 600 to other devices (e.g., the server system 114, the media device 106, and other client device 102 or 104) via one or more network interfaces 604 (wired or wireless) and the local network 110 and one or more networks 112, such as the Internet, other wide area networks, local area networks, metropolitan area networks, and so on;
- User interface module 620 for enabling presentation of information (e.g., a graphical user interface for presenting applications, widgets, websites and web pages thereof, and/or games, audio and/or video content, text, etc.) at the client device 600 via one or more output devices 612 (e.g., displays, speakers, etc.);
- Input processing module 622 for detecting one or more user inputs or interactions from one of the one or more input devices 610 and interpreting the detected input or interaction;
- Web browser module 624 for navigating, requesting (e.g., via HTTP), and displaying websites and web pages thereof, including a web interface for joining the session 116;
- Media device application 626 for interacting with a media device 106, including logging into a user account associated with the media device 106, controlling the media device 106 if associated with the user account, and editing and reviewing settings and data associated with the media device 106;
- Client-side game module 628 for providing client-side functionalities associated with one or more gaming titles, including but not limited to setting up game sessions, locally storing session state data and other game-related data, receiving gameplay inputs from the input device 610, and providing gameplay outputs (e.g., sequences of image frames) in response to the gameplay inputs, where in some implementations the client-side game module 628 further includes one or more game applications 629 corresponding to one or more gaming titles;
- Data download module 630 for downloading data (e.g., game controller configurations 640, client-side game module 628 and other applications, updates to modules and applications and data in memory 606) from server system 114 and other content hosts and providers; and
- client data 632 storing at least data associated with the game application 629 and other applications/modules, including:
  - Client device settings 634 for storing information associated with the client device 600 itself, including common device settings (e.g., service tier, device model, storage capacity, processing capabilities, communication capabilities, etc.);
  - Media device settings 636 for storing information associated with user accounts of the media device application 626, including one or more of account access information, and information for device settings (e.g., service tier, device model, storage capacity, processing capabilities, communication capabilities, etc.);
  - Game application(s) settings 638 for storing information associated with user accounts of the game application(s), including one or more of account access information, in-game user preferences, gameplay history data, and information on other players;
  - Game controller configuration(s) 640 for storing information associated with configurations (e.g., received configurations from game controller configurations 456, FIG. 4) of client-side game module 628 for game application(s) 628;
  - Location data 642 including information associated with the presence, proximity or location of any of the client device 102 and 104 and the media device 106; and
  - Local game session data 644 including information associated with online gaming sessions that are executed on the client device 600 in association with different gaming titles, e.g., latest status information, texture pages, vertex pages, constant pages, and frame data of one or more image frames associated with each of the online gaming sessions.

In some implementations not shown in FIG. 6, the client-side game module 628 includes a commands module for transmitting messages (e.g., setup commands) between the client device 102 and the media device 106 in a menu mode, a streaming module for transmitting gameplay commands between the client device 102 and the server system 114 (e.g., to the media streaming server 120) in a gameplay mode, and a controller module for providing a gameplay input interface to the gaming application. In some implementations, the client-side game module 628 is a part (e.g., a sub-module) of the media device application 626 or another application in memory 606. In some implementations, the client-side game module 628 is a part of the operating system 616. In some implementations, the client-side game module 628 is a distinct module or application.

In some implementations of the client device 102, the media device application 626 (and correspondingly media device settings 636) and game application 629 (and correspondingly game application settings 638) are optional. Depending on the particular game to which the client device 102 is invited to join, the media device application 626 and the game application 629 are not required to play. If any of these applications are needed for playing the game (e.g., the game uses a client-side game module 628 within the media device application 626), and the application is not in memory 606, the client device 102 may be prompted to download the application.

In some implementations, the client device 102 includes a game controller device. The game controller device includes one or more input device(s) 610 that facilitate user input, such microphones (or a voice-command input unit), buttons, directional pad(s), and joystick(s). In some implementations the game controller 102 further includes gesture recognition features. The game controller 102 also includes one or more output device(s) that facilitate audio output and/or visual output, including speaker(s) 320, LED(s), and/or optionally, a display.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
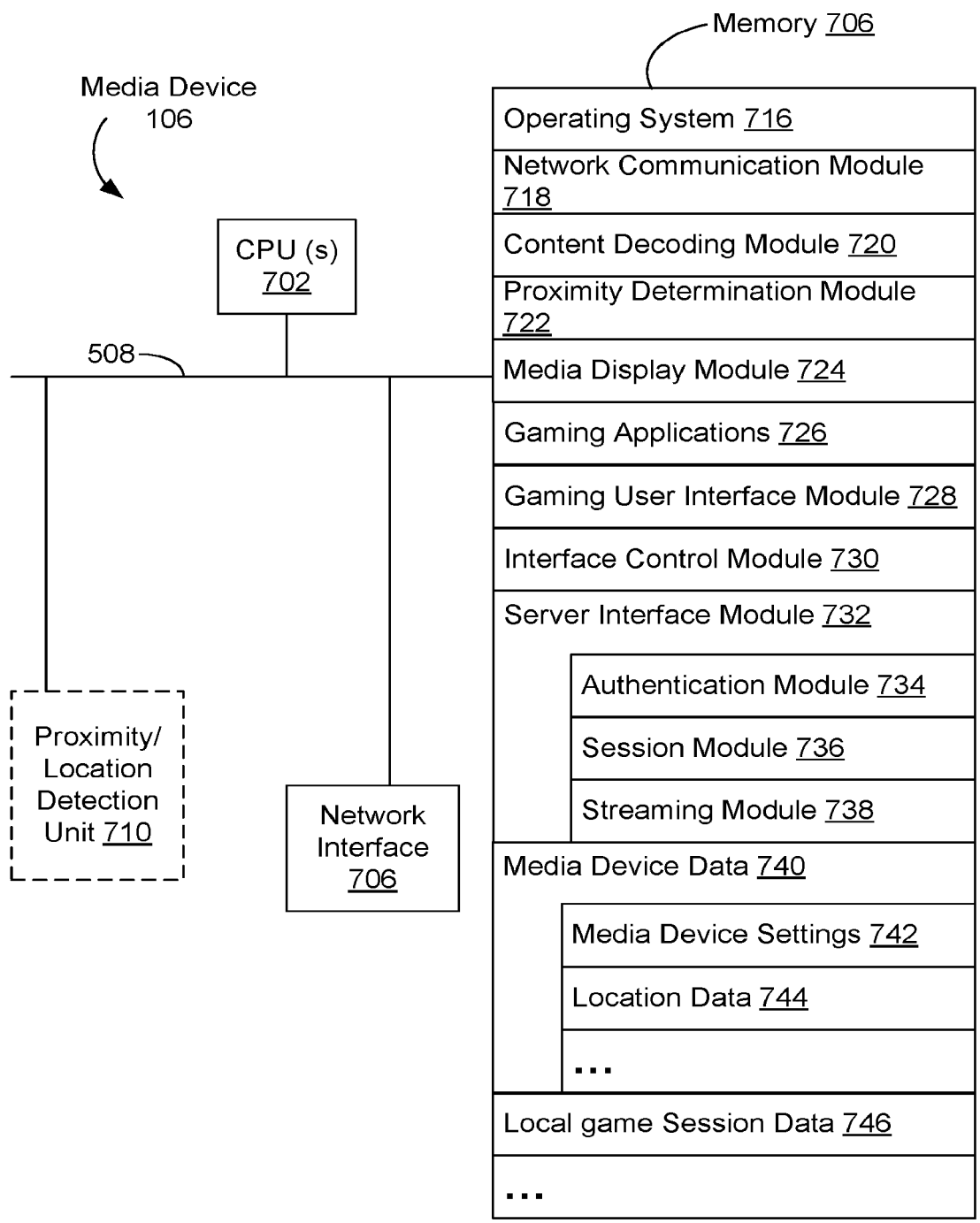
FIG. 7 is a block diagram illustrating an example media device in accordance with some implementations.

FIG. 7 is a block diagram illustrating an example media device 106 of the gaming environment 100 in accordance with some implementations. The media device 106, typically, includes one or more processing units (CPUs) 702, one or more network interfaces 704, memory 706, and one or more communication buses 708 for interconnecting these components (sometimes called a chipset). Optionally, the media device 106 includes a proximity/location detection unit 710, such as an IR sensor, for determining the proximity of a client device 102 or 104.

Further, in some implementations, the media device 106 includes radios that enable one or more communication networks and allow the media device 106 to communicate with other devices (e.g., with the client device 102). In some implementations, the radios are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Whispernet, Bluetooth low energy etc.), custom or standard wired protocols (e.g., Ethernet, HomePlug etc.), and/or any other suitable communication protocol, including communication protocols not yet developed as of the filing date of this document.

Memory 706 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the media device 106 to other computers or systems (e.g., the server system 114, and the client device 102) via one or more network interfaces 704 (wired or wireless) and one or more networks 112, such as the Internet, other wide area networks, local area networks, metropolitan area networks, cable television systems, satellite television systems, IPTV systems, and so on;

Content decoding module 720 for decoding content signals received from one or more content sources (e.g., server system 114 for output from the game session 116) and outputting the content in the decoded signals to an output device 108 coupled to the media device 106;

Proximity determination module 722 for determining the proximity of the client device 102 and/or 104 based on proximity related information that is detected by the proximity detection unit 710 or provided by the server system 114;

Media display module 724 for controlling media display; and

Gaming applications 726 for controlling the lifecycle of all the gaming components on the media device 106, receiving messages (e.g., commands) from a game controller 102, and for relaying game controller inputs to the server system 114;

Gaming user interface module 728 for accessing user content (e.g., profile, avatar, purchased games, game catalog, friends, messaging) and optimized images for display, and for receiving inputs from a client device 102 during gameplay;

Interface control module 730 for interfacing communications between the gaming application 726 and the gaming user interface module 728, and for initiating a session pairing request with the server system 114 during a game launch;

Server interface module 732 for communications with the server system 114 and an authentication system (if any), including:
  Authentication sub-module 734 for communicating with the authentication system to authenticate a linked user of the game controller;
  Session sub-module 736 for receiving gaming session information (e.g., session id, game server provisioning IP address, port etc.) from the server system 114, and for invoking a callback on the interface control module 730 providing this information; and
  Streaming sub-module 738 for receiving and displaying, in real time during gameplay, gaming streams transmitted from the media streaming server 120 of the server system 114; and Media device data 740 storing at least data including:
- Media device settings 742 for storing information associated with user accounts of a media device application, including one or more of account access information and information for device settings (e.g., service tier, device model, storage capacity, processing capabilities, communication capabilities, etc.);
- Location data 744 including information associated with the presence, proximity or location of any of the client device 102 and/or 104, and the media device 106; and
- Local game session data 746 including information associated with online gaming sessions that are executed on the client device 600 in association with different gaming titles, e.g., latest status information, texture pages, vertex pages, constant pages, and frame data of one or more image frames associated with each of the online gaming sessions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Static Memory Pool

Figure 8A:
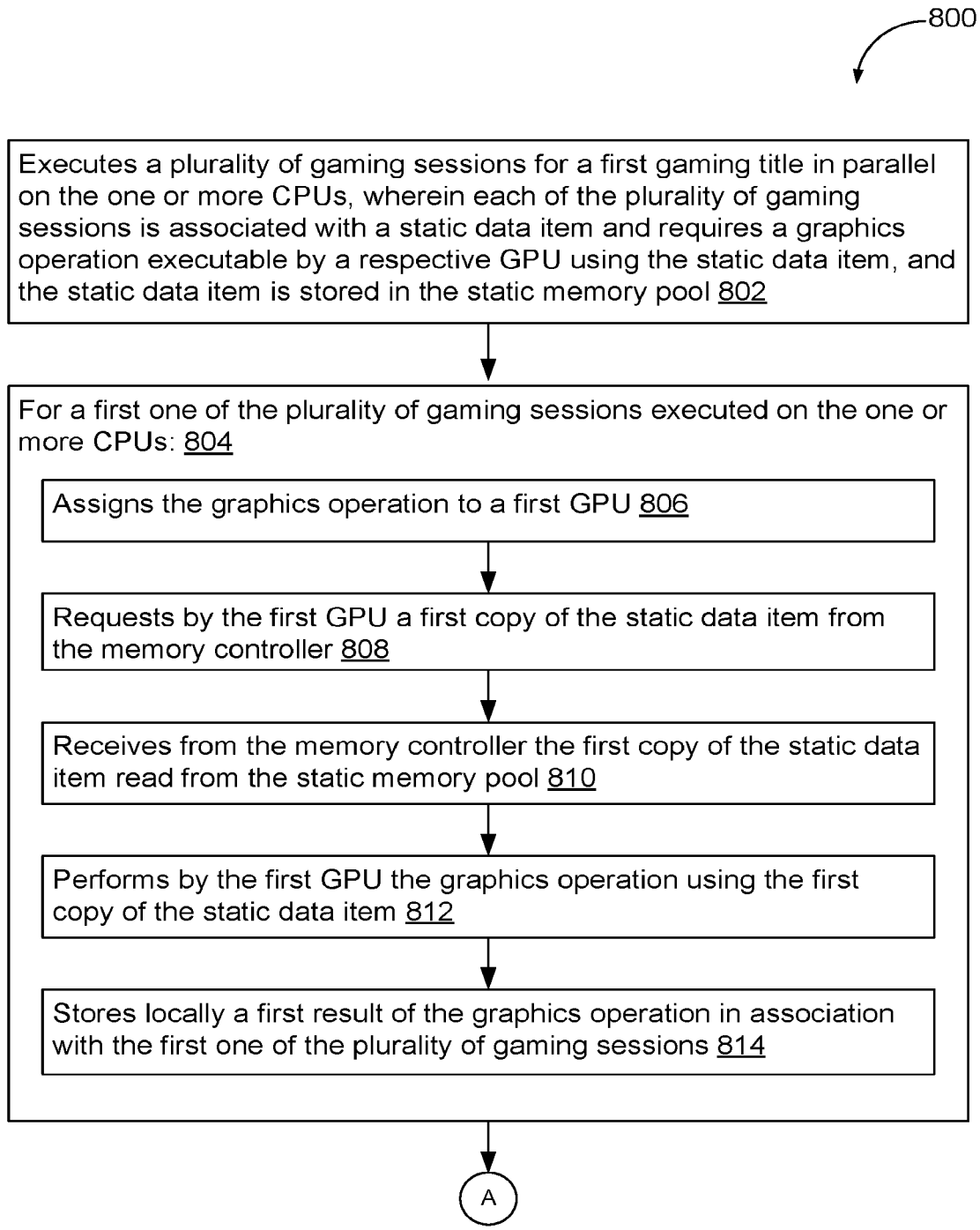
FIGS. 8A and 8B are a flow diagram illustrating an example method for managing storage capability of a server system that hosts one or more gaming titles in accordance with some implementations.
Figure 8B:
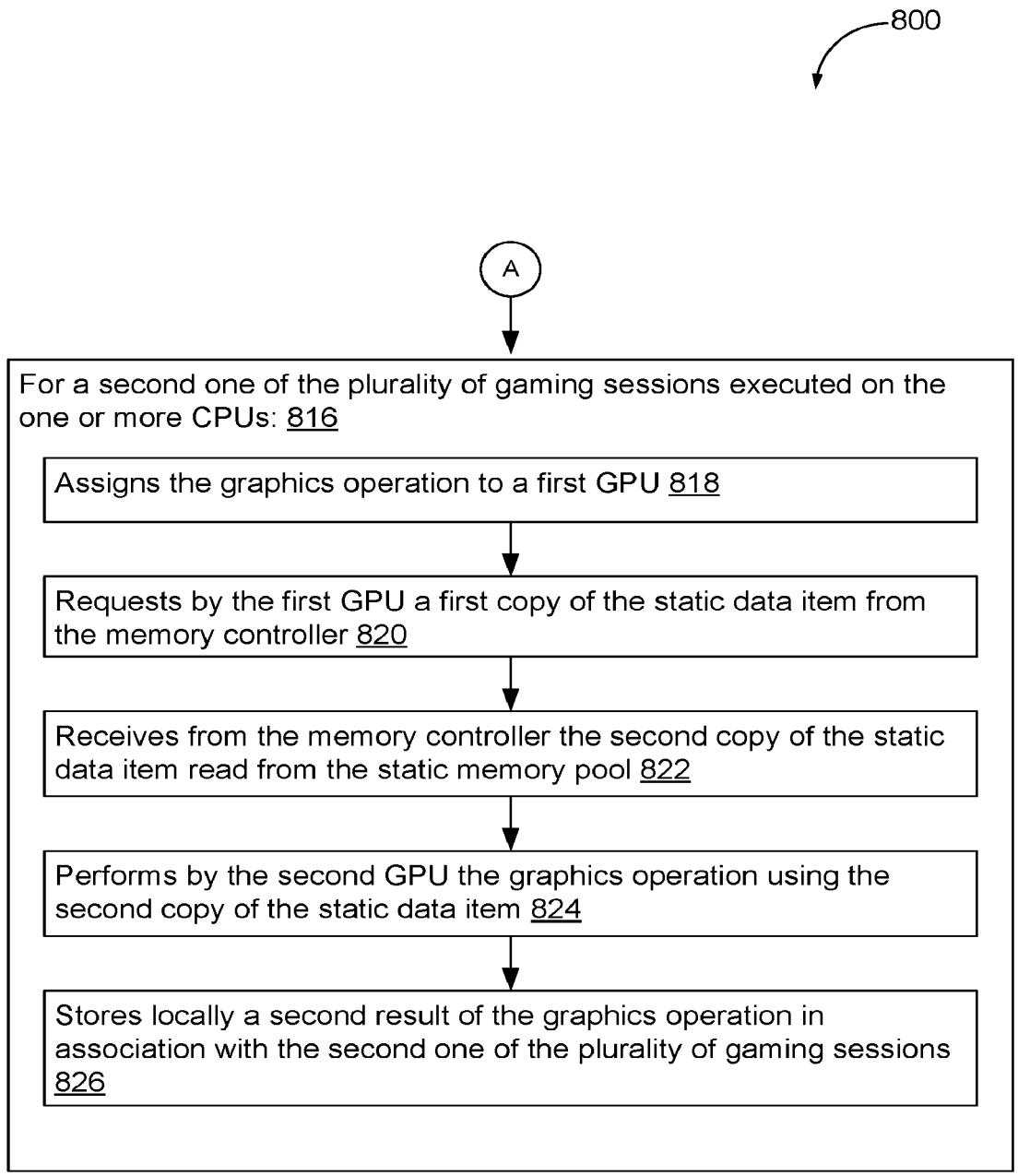

FIGS. 8A and 8B are a flow diagram 800 illustrating an example method for managing storage capability of a server system that hosts one or more gaming titles in accordance with some implementations. Method 800 is, optionally, governed by instructions that are stored in a computer memory or non-transitory computer readable storage medium (e.g., server-side game module 526 in FIG. 5A) and that are executed by one or more processors of the server system 114 (e.g., the CPUs and GPUs of the game server 118). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 800 may be combined and/or the order of some operations may be changed.

The server system 114 includes one or more CPUs 138, a plurality of GPUs 140, main dynamic memory 144 storing programs and data for use by the CPUs and/or GPUs during program execution, a static memory pool 202 stored in a non-volatile memory, and a memory controller 204 configured to manage the static memory pool. Each of the GPUs 140 includes a local cache and is configured to access the static memory pool 202 via the memory controller 204. In some implementations, the static memory pool 202 is disposed in proximity to, and shared by the one or more CPUs 138 and the plurality of GPUs 140 of the server system 114. The CPUs 138 and GPUs 140 access the static memory pool 202 via a data bus. Further, in some implementations, the main dynamic memory 144 is disposed in proximity to, and shared by the one or more CPUs and the plurality of GPUs of the server system. The CPUs 138 and GPUs 140 access the main dynamic memory 144 via a data bus. In some implementations, the static memory pool 202 has a distance from each of the one or more CPUs and the plurality of GPUs of the server system 114, and the distance is less than a predetermined distance threshold (e.g., <3 meters). That said, the static memory pool 202 is physically located in a server rack on which the one or more CPUs and the plurality of GPUs of the server system 114 are disposed.

In some implementations, the memory controller 204 is configured to manage both the main dynamic memory and the static memory pool. Alternatively, in some implementations, the memory controller 204 includes a first memory controller, and the server system further includes a second memory controller that is distinct from the first memory controller and configured to manage the main dynamic memory.

The server system 114 executes (802) a plurality of gaming sessions for a gaming title in parallel on the one or more CPUs 138. Each of the plurality of gaming sessions is associated with a static data item and requires a graphics operation executable by a respective GPU 140 using the static data item, and the static data item is stored in the static memory pool 202. In some implementations, the graphics operation is part of an OpenGL graphics rendering pipeline, and includes one of vertex processing, tessellation, geometry processing, primitive assembly, rasterization, fragmentation and pre-sampling. In some implementations, the static data item is predefined by a developer of the gaming title during a game development stage. The predefined static data item loaded into the static memory pool 144 when the gaming title is initially loaded onto the server system. In some implementations, the static data item includes one or more standard parameters used in an OpenGL rendering pipeline. Examples of the static data item include, but are not limited to, standard textures, vertex, geometries and constants originally loaded from an OpenGL library.

For a first one of the plurality of gaming sessions executed (804) on the one or more CPUs 138, the CPUs 138 assigns (806) the graphics operation to a first GPU. The first GPU requests (808) a first copy of the static data item from the memory controller 204, and receives (810) from the memory controller the first copy of the static data item read from the static memory pool 204. In some implementations, after receiving from the memory controller the first copy of the static data item read from the static memory pool, the first GPU stores the first copy temporarily in the local cache or the main dynamic memory. The first GPU then performs (812) the graphics operation using the first copy of the static data item, and stores (814) locally a first result of the graphics operation in association with the first one of the plurality of gaming sessions. In some implementations, the first GPU has a plurality of GPU cores and a common cache shared by the plurality of GPU cores, and each GPU core includes a respective cache memory storing instructions and data used by the respective GPU core.

In some implementations, the server system 114 includes a shader cache that stores one or more compiled shaders used by the plurality of GPUs to perform the graphics operation. Further, in some implementations, the server system 114 identifies a performance criterion for the first one of the plurality of gaming sessions, and selects one of the plurality of compiled shaders according to the performance criterion. The selected one of the plurality of compiled shaders is used by the first GPU to perform the graphics operation.

Similarly, for a second one of the plurality of gaming sessions executed (816) on the one or more CPUs, the CPUs 138 assigns (818) the graphics operation to a second GPU. The second GPU requests (820) a second copy of the static data item from the memory controller, receives (822) from the memory controller 204 the second copy of the static data item read from the static memory pool 202. The second GPU then performs (824) the graphics operation using the second copy of the static data item, and stores locally a second result of the graphics operation in association with the second one of the plurality of gaming sessions.

In some implementations, the main dynamic memory 144 includes a dynamic random-access memory, and each of the local cache of the GPUs and a local cache of the one or more CPUs includes a static random-access memory. The static memory pool includes one of a solid state drive, a flash memory and a phase-change random-access memory. An access rate to the local cache is faster than an access rate to the main dynamic memory 144, which is faster than an access rate to the static memory pool. In some implementations, a latency caused by an access to the static memory pool is compensated during gaming content rendering in the respective GPU.

In some implementations, the first result of the graphics operation is stored in the local cache of the respective GPU (e.g., GPU cache 364 in FIG. 3C) in association with the first one of the plurality of gaming sessions. The graphics operation is a first graphics operation, and is followed by a second graphics operation. During execution of the second graphics operation, the first GPU 140 obtains the first result of the first graphics operation from the local cache, and performs the second graphics operation using the first result of the first graphics operation. Optionally, the second graphics operation directly or indirectly follows the first graphics operation. In some implementations, both the first and second graphics operations are part of a graphics pipeline process (e.g., an OpenGL rendering pipeline) that generates a gaming content stream in response to a user request or input received from a client device engaged in the first one of the plurality of gaming sessions. In an example, both the first and second graphics operations are two consecutive operations in the OpenGL rendering pipeline. The first result is an intermediate result generated in the OpenGL rendering pipeline, and can be purged from the local cache after it is used by the second graphics operation.

Alternatively, in some implementations, the first result of the graphics operation is stored in the main dynamic memory 144 in association with the first one of the plurality of gaming sessions. The graphics operation includes a first graphics operation, and is followed by a second graphics operation. During execution of the second graphics operation, the first GPU 140 obtains the first result of the graphics operation from the main dynamic memory 144, and performs a second graphics operation following the first graphics operation using the first result of the first graphics operation. Optionally, the first result is stored as part of the dynamic data 306 (e.g., game session data 562).

In some implementations, the server system 114 further includes an encoder 142. The encoder 142 encodes the encoder the first result to an image frame associated with the first one of the plurality of gaming sessions. The image frame is provided to a client device engaged in the first one of the plurality of gaming sessions.

In some implementations, the static data item includes one or more compiled shaders used by the plurality of GPUs 140 to perform the graphics operation. Further, in some implementations, when the static data item includes a plurality of compiled shaders, the first GPU identifies a performance criterion for the first one of the plurality of gaming sessions, and selects one of the plurality of compiled shaders according to the performance criterion. The selected one of the plurality of compiled shaders is used by the first GPU to perform the graphics operation.

It is noted that the static data item is shared among the plurality of gaming sessions, including the first one and the second one of the plurality of gaming sessions. In some implementations, each of the plurality of gaming sessions is associated with a priority, and each of the first and second GPUs receives from the memory controller the respective copy of the static data item read from the static memory pool in accordance with the priorities of the first and second gaming sessions. For example, the first gaming session has a higher priority than the second gaming session, and the first GPU requests the first copy simultaneously with or within a threshold duration of time after the second GPU requests the second copy. The second GPU is suspended from receiving the second copy until the first GPU has received the first copy from the memory controller.

In some implementations, the static memory pool 202 includes a hash table, and a plurality of static data items are stored in the static memory pool 202 in association with the gaming title according to the hash table. In some implementations, the static data item is associated with a tag indicating that the static date item is read-only.

In some implementations, the memory controller 204 receives a release request to release the static data item. In response to the release request, the memory controller 204 determines whether the static (e.g., cold) memory pool is full. In accordance with the static (e.g., cold) memory pool is full, the memory controller 204 releases the static data item based on an LRU page replacement method. In accordance with the static (e.g., cold) memory pool is not full, the memory controller 204 aborts releasing the static data item. The memory controller 204 includes a page release module 374 configured to release data stored in the static memory pool 202.

In some implementations, the static memory pool 202 is partitioned to a plurality of pages, and each of the plurality of pages has a page hash identifying locations for data stored in the respective page. The memory controller 204 reads from and writes into the static memory pool 202 according to the page hash of each page. In an example, this static memory pool 202 includes a PRAM.

It should be understood that the particular order in which the operations in FIGS. 8A and 8B have been described are merely exemplary and are not intended to indicate that the described order is the only order in which the operations could be performed. One of ordinary skill in the art would recognize various ways to execute online gaming sessions using data stored in a static memory pool as described herein. Additionally, it should be noted that details of other processes described herein with respect to method 900 (e.g., FIG. 9) are also applicable in an analogous manner to method 800 described above with respect to FIGS. 8A-8B. For brevity, these details are not repeated here.

Figure 9:
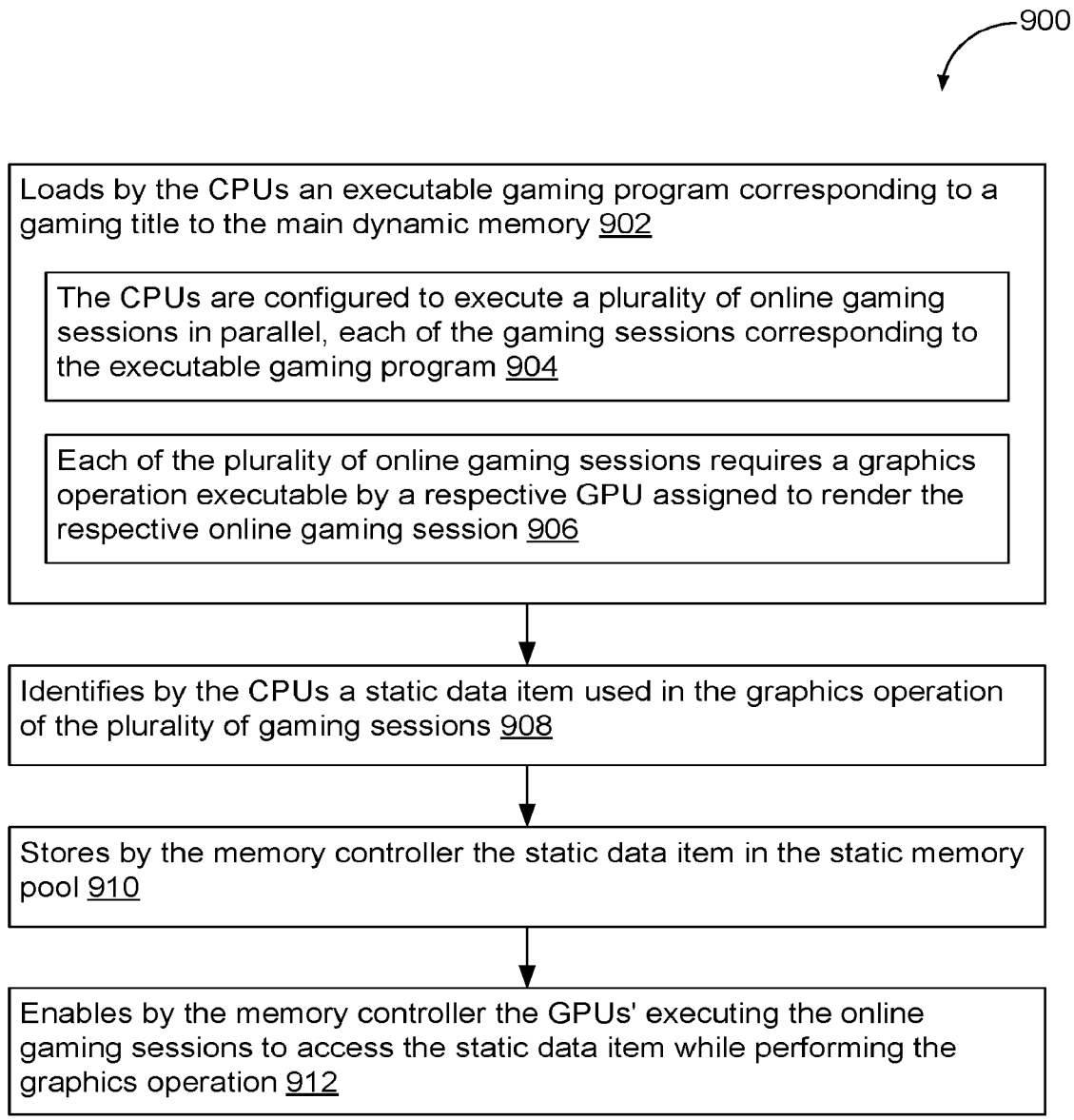
FIG. 9 is a flow diagram illustrating an example method for loading a gaming title to a server system in accordance with some implementations.

FIG. 9 is a flow diagram illustrating an example method 900 for loading a gaming title to a server system 114 in accordance with some implementations. Method 900 is, optionally, governed by instructions that are stored in a computer memory or non-transitory computer readable storage medium (e.g., memory 506 in FIG. 5A) and that are executed by one or more processors of the server system 114 (e.g., the CPUs and GPUs of the game server 118). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 900 may be combined and/or the order of some operations may be changed.

The server system 114 includes one or more CPUs 138, a plurality of GPUs 140, main dynamic memory 144 storing programs and data for use by the CPUs and/or GPUs during program execution, a static memory pool 202 stored in a non-volatile memory, and a memory controller 204 configured to manage the static memory pool. Each of the GPUs 140 is configured to access the static memory pool 202 via the memory controller 204.

The CPUs 138 loads (902) an executable gaming program (e.g., server-side game module 526) corresponding to a gaming title to the main dynamic memory 144. The CPUs 138 are configured to execute (904) a plurality of online gaming sessions in parallel, and each of the gaming sessions corresponds to the executable gaming program. Each of the plurality of online gaming sessions requires (906) a graphics operation executable by a respective GPU assigned to render the respective online gaming session.

The CPUs 138 identifies (908) a static data item used in the graphics operation of the plurality of gaming sessions. In some implementations, the static data item includes a first static data item, and the first static data item is identified by the CPUs 138 in a list of predetermined static data items. The list of predetermined static data items includes a first subset of static data items and a second subset of static data items. The memory controller stores the first subset of static data items including the first static data item in the static memory pool 202, and stores the second subset of static data items in the main dynamic memory 144.

The memory controller 204 stores (910) by the static data item in the static memory pool, and enables (912) the GPUs' executing the online gaming sessions to access the static data item while performing the graphics operation. In some implementations, the static data item is a standard static data item used in rendering of the gaming title. Prior to storing the static data item in the static memory pool, the CPUs 138 retrieves the static data item from a hard drive 324 of the server system 114 or a remote library server. For example, the static data item includes a shader program stored in a shader library server 124. The CPUs 138 obtains the shader program from the shader library server 124 and stores it in the static memory pool 202 during the course of loading the gaming title. Alternatively, in some implementations, the static data item is a custom static data item predefined by a developer of the gaming title and stored in the hard drive 324 of the server system 114. Prior to storing the static data item in the static memory pool, the CPUs 138 retrieves the static data item from the hard drive 324 of the server system 114. More details on loading a gaming title to a server system 114 are explained above with reference to FIG. 4A.

In some implementations, in accordance with the executable gaming program, the CPUs 138 allocate each of the plurality of GPUs to a subset of the plurality of online gaming sessions to be executed thereon. For each of the plurality of gaming sessions, during execution of the graphics operation by a respective GPU, the respective GPU 140 obtains a copy of the static data item from the static memory pool via the memory controller and performing the graphics operation using the copy of the static data item. In some implementations, for each of the plurality of gaming sessions, during execution of the graphics operation by the respective GPU, the respective GPU 140 loads the copy of the static data item into a respective local cache of the respective GPU. Further, in some implementations, for each of the plurality of gaming sessions, during execution of the graphics operation by the respective GPU, the respective GPU 140 stores in the main dynamic memory 144 a dynamic data item and user information in association with the respective online gaming session. In some implementations, for a subset of the plurality of gaming sessions, the GPUs 140 load the copy of the static data item into a local cache of the GPUs once and share the copy of the static data item by a subset of the GPUs corresponding to the subset of the plurality of gaming sessions. More details on rendering image frames of an online gaming session using the static data item are explained above with reference to FIGS. 4B and 8A-8B.

It should be understood that the particular order in which the operations in FIG. 9 have been described are merely exemplary and are not intended to indicate that the described order is the only order in which the operations could be performed. One of ordinary skill in the art would recognize various ways to loading a gaming title to a server system 114 as described herein. Additionally, it should be noted that details of other processes described herein with respect to method 800 (e.g., FIGS. 8A-8B) are also applicable in an analogous manner to method 900 described above with respect to FIG. 9. For brevity, these details are not repeated here.

Shader Optimization

During the course of rendering image frames for online gaming sessions, the GPUs 140 obtain shaders in a source form (GLSL, HLSL) or an intermediate form (DXIL, SPIR-V) along with other pipeline state data, and compile the shaders for use by the GPUs to render gaming content (e.g., output a sequence of image frames associated with an online gaming session). Shader compilation can be expensive. For example, some gaming applications require compiling more than 100,000 shaders each of which takes several milliseconds. If shader compilation is done in real time in response to user inputs, it will take an extended load time and compromise user experience. In some situations, shader compilation is simplified for the purposes of reducing compilation time, and however, the quality of the resulting compiled shaders are compromised due to a time-sensitive nature of shader compilation. //Clarification from this paragraph to next eight paragraphs copied from disclosure.

In some implementations of this application, the GPUs 140 are connected by a fast path to computational resources in the server system 114. A fleet-wide caching of compiled pipelines are prepared in advance, indexed by a hash of compiler inputs, and stored locally to eliminate or reduce shader compilation time. Additionally, in some implementations, a fleet-wide performance analysis can be conducted to identify candidate shaders for more extensive optimization, either by hand or by a slower but more effective shader pipeline compiler (e.g., shader pipeline optimizer 534 in FIG. 5A). In some implementations, compiled shaders are dynamically replaced in the fleet-wide cache (e.g., a shader cache 318) with higher performance shaders, or shaders having some other characteristics. In some implementations, a set of different compiled shaders are stored for deployment in specific situations, including shaders specialized for the performance-guided-optimization stage. In some implementations, shaders used in gaming content rendering are recompiled as the shader pipeline compiler (e.g., compiler 532) is being improved, and the game application itself is not impacted by these shader optimization operations. In some implementations, detailed analysis is implemented on feature usage, without perturbing a game driver (also called a server-side game module 526 in FIG. 5A). In some implementations, specialized shaders are compiled, tested and selected for a particular gaming title without perturbing a game driver (i.e., server-side game module 526) running on the GPUs 140.

In some implementations, the game driver (specifically, a shader pipeline optimizer 534 of a server-side game module 526) transparently intercept shader pipeline creation/compilation calls in the game driver, which runs on every GPU that serves graphics. The game driver evaluates a hash of all the inputs to the shader compiler, and send a request to a shader pipeline server (or a shader cache) for a matching compiled shader. In the case that the shader pipeline server or cache returns that there is no matching shader (or a timeout), the game driver uses the traditional compilation pipeline and stores the result to the shader pipeline server or the shader cache, as well as using it for that online gaming session. The shader pipeline server may be implemented in many ways. The shader pipeline server is optionally a central single server, or a distributed/federated set of servers employing standard distributed database technologies (including replication for lower latency access).

In some implementations, the game driver (specifically, a shader pipeline optimizer 534 of a server-side game module 526) conduct fleet-wide analysis and performance-guided optimization. Examples of the fleet-wide analysis include timing analysis, shader performance analysis and power consumption analysis. Specifically, in some implementations, a sample set of sessions are selected from all online gaming sessions associated with a gaming title. These loads (i.e., the sampled sessions) are executed by a game driver specialized in collecting the time required to run each shader pipeline and reporting to a central database. Optionally, the sampled sessions are analyzed in the background using the game servers 118 that run the online gaming sessions simultaneously in the foreground. In some situations, this measurement may perturb the game application (and therefore the user experience), so the sampled sessions are analyzed on a separate pipeline optimizer server 150. This allows the user experience to remain high quality while gathering usage statistics. In some implementations, a shader pipeline optimizer 534 samples selectively within an online gaming session, e.g., samples particular shaders, or a subset of image frames, to reduce the impact on game content rendering in the foreground. We then use these timings to select good candidate shaders for further optimization and invoke manual review or automated systems to refine the shaders. Alternatively, in some implementations, power consumption is monitored and used to optimize a shader pipeline (i.e., a sequence of compiled shaders). Specifically, the shader pipeline optimizer 534 is instrumented to measure power draw instead of timing performance.

In some implementations involving detailed shader analysis, the shader pipeline optimizer 534 selects a modified shader and driver that collects fine-grained shader execution information, e.g., instrumenting each basic block to emit a tag into an auxiliary GPU buffer. The auxiliary GPU buffer is then either analyzed locally or uploaded in its entirety to our analysis database (e.g., included in database 160). The instrumented shader is created off-line from the assets in our fleet-wide shader pipeline cache, without perturbing the production drivers.

In some implementations of shader specialization, frequent optimization is applied in the shader pipeline optimizer 534 to specialize shaders for popular gaming titles/applications (often manually by a highly trained engineer), thereby replacing machine compiled codes with manually-tuned codes. The fleet-wide cache is used to perform this replacement without redeploying drivers by replacing the compiled shader pipeline in the fleet-wide cache. In some implementations, multiple versions of the compiled shader are stored in the fleet-wide cache and deployed to perform different statistical analyses. In some implementations, both power optimized shaders and performance optimized shaders are stored in the shader cache, but are dynamically deployed according to a performance criterion, e.g., to manage peak power consumption of games. It is noted that this extends to any number of performance management axes, e.g., power, time, memory usage and code size. Additionally, in some implementations, In some implementations involving compiler updates and profiling, the shader pipeline optimizer 534 runs a new version of shader compiler against all shaders in the shader cache, and stores the new version of shader compiler alongside an earlier version of shader compiler. The optimizer 534 then uses a sample of online gaming sessions to run the new shader compiler, measures the performance impact, and determines fitness of the new shader compiler. By these means, both the compiled shaders and the shader compilers are dynamically improved in the background without perturbing game content rendering of the game module.

In some implementations, the server system 114 includes an application programming interface (API) to query a distributed shader pipeline cache for internal and external users. The distributed shader pipeline cache is queried for a given set of inputs, thereby enabling further inspection and analysis. For example, map-reduce-style queries are run on the distributed shader pipeline cache for fleet-wide analysis of individual shaders and shader pipelines. This API includes a most commonly used blend of instructions for depth-only passes, and may be implemented as an export pipeline to Dremel or the like. Further, the API is configured to provide a compiler explorer interface by leveraging a pipeline-shader-compiler-as-infrastructure.

Figure 10:
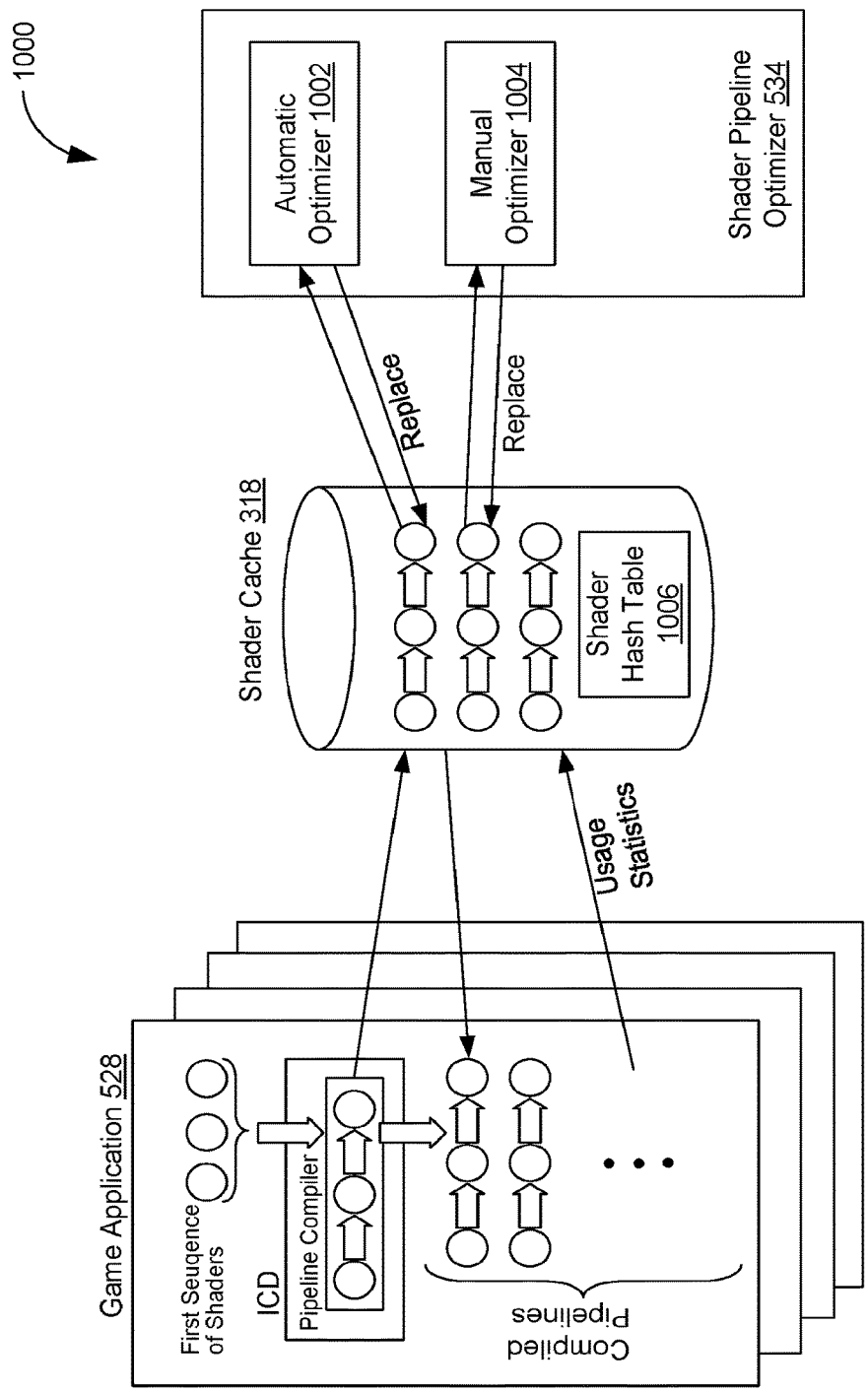
FIG. 10 is an example process of optimizing pipelined shaders concurrently with game rendering in a server system in accordance with some implementations.

FIG. 10 is an example process 1000 of optimizing pipelined shaders concurrently with gaming content rendering in a server system 114 in accordance with some implementations. As shown in FIG. 5A in some implementation, a server-side game module 526 includes a game application 528, a shader pipeline optimizer 534, a game rendering module 538, and a shader cache 318, which function cooperatively to enable concurrent gaming content rendering and shader pipeline optimization. Specifically, while the game application 528 executes online gaming sessions in a graphics pipeline process in the foreground, the shader pipeline optimizer 534 optimizes compiled shaders used in this graphics pipeline process in the background.

The CPUs 138 of the server system 114 execute the game application 528 corresponding to a gaming title to run a plurality of online gaming sessions in parallel. The CPUs 138 allocates each of a subset of the GPUs 140 to execute a subset of the plurality of online gaming sessions (e.g., one or more sessions). The GPUs 140 then identify a first sequence of compiled shaders, and uses the identified first sequence of compiled shaders to render a plurality of image frames for each of the online gaming sessions. In some implementations, the first sequence of compiled shaders has been stored in the shader cache 318, and once identified, it is directly loaded form the shader cache to the GPUs 140 to render image frames for the online gaming sessions according to instructions of the gaming application 528. In some implementations, execution of the plurality of online gaming sessions must comply with a specific performance criterion, and the first sequence of compiled shaders are identified according to the specific performance criterion before they are used to render the image frames for each of the online gaming sessions.

While the GPUs execute the plurality of online gaming sessions, the shader pipeline optimizer 534 optimizes the first sequence of compiled shaders in the background. Stated another way, the CPUs 138 allocate an unused subset of the CPUs and GPUs in the server system 114 to identify an alternative sequence of compiled shaders or another version of the first sequence of compiled shaders with respect to one or more performance criteria. Optionally, the game servers 118 also includes both the unused subset of the CPUs and GPUs allocated for shader pipeline optimization and the active CPUs and GPUs that execute the online gaming sessions. Optionally, a pipeline optimizer server 150, distinct from the game servers 118, includes the subset of the CPUs and GPUs allocated for shader pipeline optimization.

Specifically, while the game application 528 executes the plurality of online gaming sessions, the shader pipeline optimizer 534 identifies a performance criterion for the plurality of online gaming sessions associated with the gaming title, and collects usage statistics characterizing execution of each of the online gaming sessions using the first sequence of compiled shaders. The shader pipeline optimizer 534 analyzes the usage statistics, and determines that performance of the first sequence of compiled shaders can be further improved with respect to the performance criterion. For example, the shader pipeline optimizer 534 determines that modification of a first shader of the first sequence of compiled shader improves performance of the first sequence of compiled shaders with respect to the performance criterion, and therefore, modifies the first shader to create a modified first sequence of compiled shader. In some implementations, the shader pipeline optimizer 534 further modifies one or more second shaders in the first sequence of compiled shaders to improve performance of the first sequence of compiled shaders with respect to the performance criterion.

In some implementations, the shader pipeline optimizer 534 includes an automatic optimizer 1002 configured to optimize the first sequence of compiled shaders with respect to the performance criterion. That said, the automatic optimizer 1002 obtains from the shader cache the first sequence of compiled shaders, and modifies the first shader in the first sequence of compiled shaders automatically and without user intervention to improve performance of the first sequence of compiled shaders with respect to the performance criterion. Alternatively, in some implementations, the shader pipeline optimizer 534 includes a manual optimizer 1004 configured to provide a user interface allowing a user to optimize the first sequence of compiled shaders with respect to the performance criterion manually. An administrator user logs onto an administrator account on a game development platform executed on an administrator client device 102. The user interface presents the performance criteria, usage statistics and other related information items to facilitate manual optimization. The server system 114 receives a user instruction to modify the first shader in the first sequence of compiled shaders, and therefore, the first shader is modified in the first sequence of compiled shaders in response to the user instruction. Further, in some implementations, the pipeline shader optimizer 534 includes both the automatic optimizer 1002 and the manual optimizer 1004, and supports automatic optimization, manual optimization, or a combination thereof.

Further, in some implementations, an alternative shader is selected from a group of alternative shader options to replace the first shader in the first sequence of compiled shaders. Optionally, the automatic optimizer 1002 automatically identifies the alternative shader options and select the alternative shader to improve the performance of the first sequence of compiled shaders with respect to the performance criterion. Optionally, the automatic optimizer 1002 automatically identify the alternative shader options, but the administrator user is prompted to select the alternative shader by the manual optimizer 1004. Optionally, the manual optimizer 1004 provides the related information items to facilitate an optimization process allowing the administrator user to identify the alternative shader options and select the alternative shader.

Referring to FIG. 10, in some implementations, the modified first sequence of compiled shaders replaces the first sequence of compiled shaders in the shader caches after it is created. Alternatively, in some implementations, the first sequence of compiled shaders and the modified first sequence of compiled shaders are stored as two versions of the first sequence of compiled shaders. Subsequently, the server system 114 collects subsequent usage statistics characterizing execution of each of the online gaming sessions, and in accordance with the subsequent usage statistics, the GPUs may select one of the two versions of the first sequence of compiled shaders to render the plurality of image frames for each of the plurality of online gaming sessions.

Alternatively, in some implementations, the performance criterion includes a first performance criterion, and the plurality of online gaming sessions are rendered and executed in accordance with a second performance criterion distinct from the first criterion. The pipeline optimizer 534 enables the shader cache 318 to associate the first performance criterion with the modified first sequence of compiled shaders, and the second performance criterion with the first sequence of compiled shaders.

In some implementations, the shader pipeline optimizer 534 obtains optimized shader pipelines for two or more performance criteria in the background. The performance criterion includes a first performance criterion, and the modified first sequence of compiled shaders is stored in association with the first performance criterion in the shader cache. After identifying the modified first sequence of compiled shaders, the shader pipeline optimizer 534 identifies a second performance criterion for the plurality of online gaming sessions associated with the gaming title, and determines a second sequence of compiled shaders to improve performance of the first sequence of compiled shaders with respect to the second performance criterion. The second sequence of compiled shaders is stored in the shader cache 318 in association with the second performance criterion.

When the shader cache 318 includes a plurality of sequences of compiled shaders, it establishes and stores a shader hash table 1006 that associates each of a plurality of performance criteria with a respective sequence of compiled shaders (FIG. 11B). The performance criterion and the first sequence of compiled shaders are associated in the shader hash table. Optionally, the first sequence of compiled shaders can have a plurality of versions. The usage statistics include information of user inputs, and the plurality versions of the first sequence is associated with different information of user inputs (FIG. 11C). For example, when the most popular user inputs is a first user input (e.g., a jump), a first version of the first sequence of compiled shaders is used to satisfy a corresponding performance criterion, and when the most popular user inputs is a second user input (e.g., shooting), a second version of the first sequence of compiled shaders is used to satisfy a corresponding performance criterion. Further, in some implementations, the shader hash table is dynamically updated according to the usage statistics.

It is noted that the performance criterion corresponds to one or more of total power consumption, a code size, an average latency, total cache usage, and total memory usage of the first sequence of compiled shaders during the course of executing the plurality of online gaming sessions. For example, the performance criterion requires that a code size be below a threshold size. In another example, the performance criterion requires that the power consumption be reduced to a threshold power level in view of the usage statistics.

In some implementations, the usage statistics include user inputs, power consumption, one or more gaming latencies, code size, memory usage and cache usage of the first sequence of compiled shaders corresponding to each of the plurality of online gaming sessions. In a specific example, the usage statistics includes a total power consumption of the plurality of online gaming sessions. A first performance criterion and a second performance criterion correspond to response times and power usage of the plurality of online gaming sessions, respectively. In accordance with a determination that the total power consumption of the plurality of online gaming sessions exceeds a predefined power threshold and needs to be reduced, the gaming application 528 selects the second sequence of compiled shaders and renders the plurality of image frames for each of the plurality of online gaming sessions using the second sequence of compiled shaders, thereby improving the total power consumption of the plurality of online gaming sessions according to the second performance criterion.

Figure 11A:
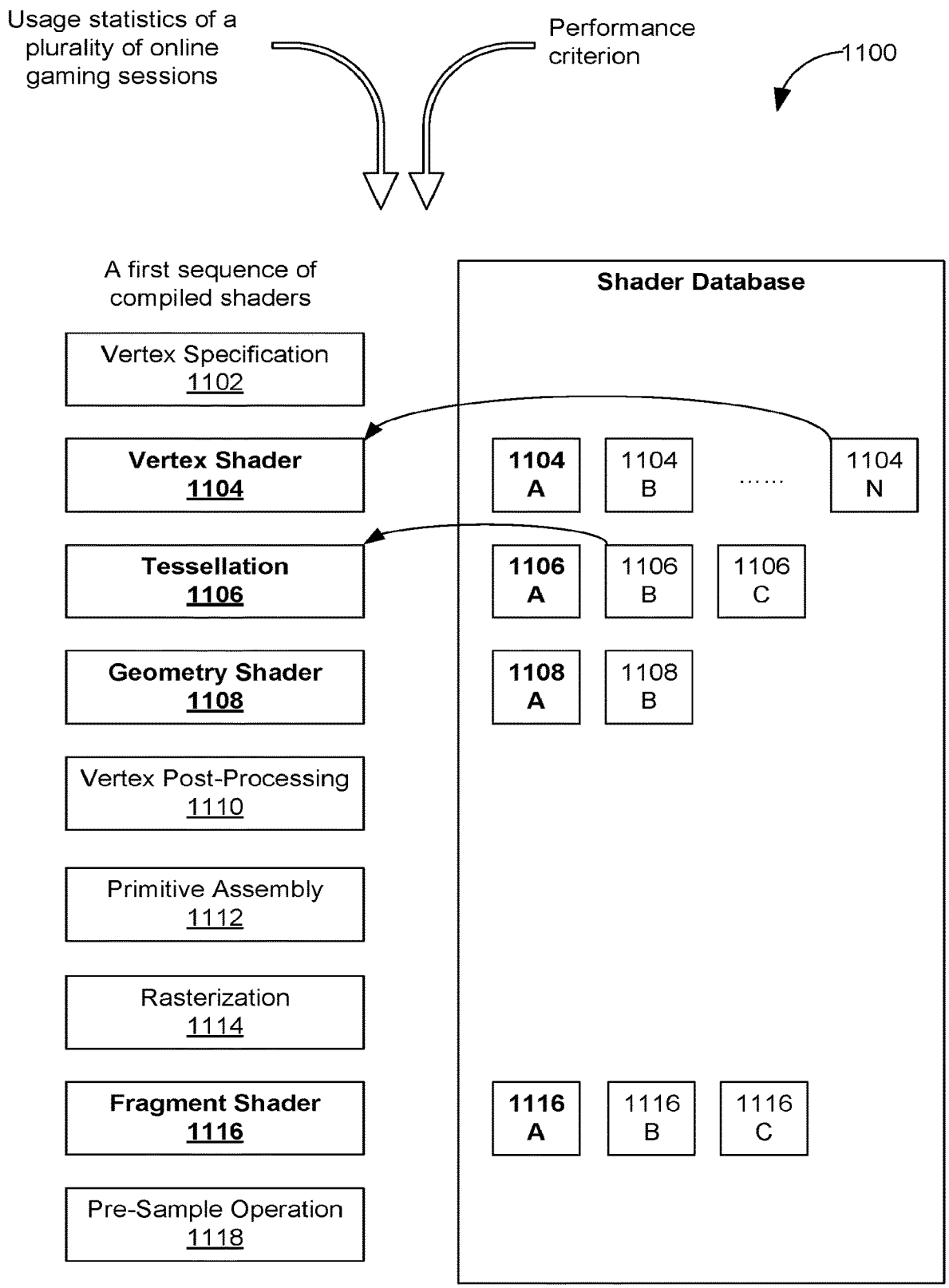
FIG. 11A is an example process of optimizing a sequence of compiled shaders in accordance with some implementations.

FIG. 11A is an example process of optimizing pipelined shaders in accordance with some implementations. A plurality of online gaming sessions related to a gaming title are executed using an OpenGL rendering pipeline. The OpenGL rendering pipeline includes at least a subset of a pipeline of operations including vertex processing (e.g., transforming vertices into screen space), primitive processing (e.g., organizing the vertices into primitives that are clipped and culled), rasterization (e.g., rasterizing the primitives into pixel fragments), fragment processing (e.g., shading fragments to compute a color at each pixel), and pixel operation (e.g., blending the fragments into a frame buffer at their pixel locations). In a specific example, the OpenGL rendering pipeline includes nine consecutive pipeline operations or stages to render an image frame for each online gaming session. The nine consecutive pipeline stages include a subset or all of:

Vertex specification 1102 for preparing vertex array data;
Vertex shader 1104 for acting upon each vertex;
Tessellation 1106 for optionally subdividing patches of vertex data into smaller primitives;
Geometry shader 1108 for optionally converting the smaller primitives to output primitives;
Vertex post-processing 1110 for adjusting and shipping the output primitives of the last stage to different locations, including but not limited to transform feedback, primitive clipping, perspective divide, and viewport transform;
Primitive assembly 1112 for dividing the output primitives into a sequence of individual base primitive;
Rasterization 1114 for breaking down each individual primitive into discrete elements (also called fragments) based on a sample coverage of the primitive;
Fragment shader 1116 for processing each fragment generated by rasterization into a set of colors and a single depth value; and
Pre-sample operation 1118 for processing the set of colors and single depth value to gameplay multimedia content that can be processed by the encoder 142, e.g., for standardization, speed and/or compression, including but not limited to pixel ownership test, scissor test, multi-sample operations, stencil test, depth test, occlusion query updating, blending, sRGB conversion, dithering, logic operation, and write mask and logic operation.

Each GPU 140 assigned to execute a subset of online gaming sessions executes the nine consecutive pipeline stages for each session of the subset of online gaming sessions. In some implementations, each of vertex shader 1104, tessellation 1106, geometry shader 1108 and fragment shader 1116 includes a respective set of programmable shaders. For any shader in the respective set of programmable shaders, the shader pipeline optimizer 534 has an option of modifying the respective shader, thereby creating a modified sequence of shader pipeline.

More specifically, in an example, the game application 528 executes a plurality of gaming sessions, and renders a plurality of image frames for each of the plurality of online gaming sessions using a first sequence of compiled shaders. The first sequence of compiled shaders include a vertex shader 1104A, a tessellation shader 1106A, a geometry shader 1108 and a fragment shader 1116A that are programmable shaders. While the plurality of online gaming sessions are executed in the foreground, the shader pipeline optimizer 534 identifies a performance criterion for the plurality of online gaming sessions associated with the gaming title, and collects usage statistics characterizing execution of each of the online gaming sessions. As a result, the shader pipeline optimizer 534 determines to modify the vertex shader 1104A and the tessellation shader 1106A in the first sequence of compiled shaders to improve performance of the first sequence of compiled shaders with respect to the performance criterion, thereby creating a modified first sequence of compiled shaders.

Specially, the shader pipeline optimizer 534 replaces the vertex shader 1104A and the tessellation shader 1106A with a vertex shader 1104N and the tessellation shader 1106B, while keeping the geometry shader 1108A and the fragment shader 1116A in the modified first sequence of compiled shaders. The modified first sequence of compiled shaders are then stored in the shader cache in association with the performance criterion.

FIG. 11B is a shader hash table 1006 associating a plurality of sequences of compiled shaders with a plurality of performance criteria in accordance with some implementations. FIG. 11C is a shader hash table 1180 associating a plurality of versions of a sequence of compiled shaders with a plurality of user inputs in accordance with some implementations. When the shader cache 318 includes a plurality of sequences of compiled shaders, it establishes and stores a shader hash table 1006 that associates each of a plurality of performance criteria with a respective sequence of compiled shaders. For example, the performance criterion (performance criterion 1) and the first sequence of compiled shaders are associated in the shader hash table. Optionally, the first sequence of compiled shaders can have a plurality of versions corresponding to different usage statistics. In some implementations, the usage statistics include information of user inputs, and the plurality versions of the first sequence is associated with different information of user inputs. For example, when the most popular user inputs is a first user input (e.g., a jump), a first version of the first sequence of compiled shaders is used to satisfy a corresponding performance criterion, and when the most popular user inputs is a second user input (e.g., shooting), a second version of the first sequence of compiled shaders is used to satisfy a corresponding performance criterion. Further, in some implementations, the shader hash table 1050 is dynamically updated according to the usage statistics.

Figure 12:
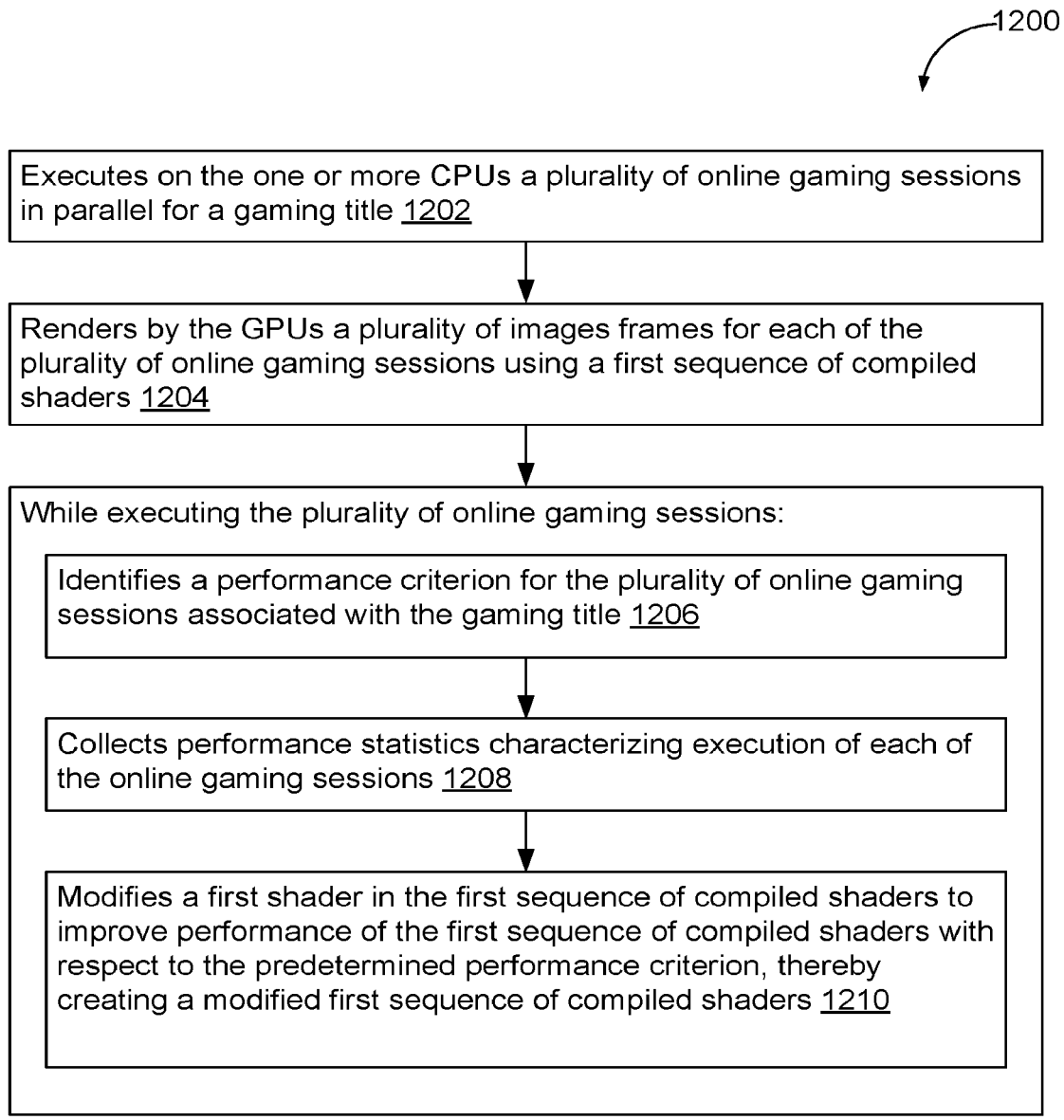
FIG. 12 is a flow diagram illustrating an example method of rendering image frames for a plurality of online gaming sessions (e.g., including optimizing pipelined shaders in the background of image rendering) in accordance with some implementations.

FIG. 12 is a flow diagram illustrating an example method 1200 of rendering image frames for a plurality of online gaming sessions (e.g., including optimizing pipelined shaders in the background of image rendering) in accordance with some implementations. Method 1300 is, optionally, governed by instructions that are stored in a computer memory or non-transitory computer readable storage medium (e.g., shader pipeline optimizer 534 in FIG. 5A) and that are executed by one or more processors of the server system 114. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1200 may be combined and/or the order of some operations may be changed.

The method 1200 is implemented at the server system 114. The server system 114 includes one or more CPUs 138, one or more GPUs 140, a main dynamic memory 144 storing programs and data for use by the CPUs and/or GPUs during program execution, and a shader cache 318. The one or more CPUs execute (1202) a plurality of online gaming sessions in parallel for a gaming title. The one or more CPUs instruct the GPUs 140 to render successive image frames for each of the plurality of online gaming sessions in response to user requests or inputs. The one or more GPUs then render (1204) a plurality of image frames for each of the plurality of online gaming sessions using a first sequence of compiled shaders. In some implementations, the plurality of online gaming sessions are sampled from all online gaming sessions that are processed by the CPUs and GPUs for the gaming title.

While executing the plurality of online gaming sessions, the server system 114 identifies (1206) a performance criterion for the plurality of online gaming sessions associated with the gaming title, and collects (1208) usage statistics characterizing execution of each of the online gaming sessions. In some implementations, the performance criterion corresponds to one or more of total power consumption, a code size, an average latency, total cache usage, and total memory usage of the first sequence of compiled shaders during the course of executing the plurality of online gaming sessions. In some implementations, the usage statistics include user inputs, power consumption, one or more gaming latencies, code size, memory usage and cache usage of the first sequence of compiled shaders corresponding to each of the plurality of online gaming sessions.

The server system 114 modifies (1210) a first shader in the first sequence of compiled shaders to improve performance of the first sequence of compiled shaders with respect to the performance criterion, thereby creating a modified first sequence of compiled shaders. In some implementations, a second shader in the first sequence of compiled shaders is modified in addition to the first shader to improve performance of the first sequence of compiled shaders with respect to the performance criterion.

In some implementations, the modified first sequence of compiled shaders replaces the first sequence of compiled shaders in the shader cache. Alternatively, in some implementations, the first sequence of compiled shaders used in the execution of the online gaming sessions is stored in the shader cache as a first version of the first sequence of compiled shaders, and the modified first sequence of compiled shaders is stored in the shader cache as a second version of the first sequence of compiled shaders. During subsequent gaming content rendering, e.g., in response to a subsequent user input, the server system 114 identifies a specific performance criterion for subsequent execution of each of the online gaming sessions, and in accordance with the specific performance criterion, selects one of the first and second versions of the first sequence of compiled shaders to render the plurality of image frames for each of the plurality of online gaming sessions.

In some implementations, to modify the first shader in the first sequence of compiled shaders, the server system 114 selects an alternative shader from a group of alternative shader options to replace the first shader in the first sequence of compiled shaders, such that performance of the plurality of online gaming sessions satisfies the performance criterion. As a result, the modified first sequence of compiled shaders includes the alternative shader. It is noted that in some implementations, the group of alternative shader options are provided from the shader library server 124. In some situations, the group of alternative shader options are presented to an administrator user managing the gaming title executed on the server system 114, and the server system 114 receives a user selection of the alternative shader from the administrator user via a client device 102 to which the administrator user has logged on.

In some implementations, an administrator user logs on an administrator account on a game application executed on an administrator client device 102, and manually optimizes the first sequence of compiled shaders based on the performance criteria and usage statistics. During this optimization process, the server system 114 receives a user instruction to modify the first shader in the first sequence of compiled shaders, and therefore, the first shader is modified in the first sequence of compiled shaders in response to the user instruction. Conversely, in some implementations, the first shader in the first sequence of compiled shaders is modified automatically and without user intervention to improve performance of the first sequence of compiled shaders with respect to the performance criterion.

In some implementations, before the GPUs render the image frames for the plurality of online gaming sessions using the first sequence of compiled shaders, the server system 114 determines that the plurality of online gaming sessions need to be rendered in accordance with the performance criterion. In view of the performance criterion, the first sequence of compiled shaders are determined for rendering the plurality of image frames for each of the plurality of online gaming sessions.

In some implementations, the performance criterion includes a first performance criterion, and the plurality of online gaming sessions are rendered and executed in accordance with a second performance criterion distinct from the first criterion. The server system 114 associates the first performance criterion with the modified first sequence of compiled shaders, and the second performance criterion with the first sequence of compiled shaders.

In some implementations, the performance criterion includes a first performance criterion, and the modified first sequence of compiled shaders is stored in association with the first performance criterion in the shader cache. Further, in some implementations, while executing the plurality of online gaming sessions, the server system 114 identifies a second performance criterion for the plurality of online gaming sessions associated with the gaming title, and determines a second sequence of compiled shaders to improve performance of the first sequence of compiled shaders with respect to the second performance criterion. The second sequence of compiled shaders is stored in the shader cache in association with the second performance criterion. Additionally, in some implementations, the usage statistics includes a total power consumption of the plurality of online gaming sessions, and the first performance criterion and the second performance criterion optimize response times and power usage of the plurality of online gaming sessions, respectively. In accordance with a determination that the total power consumption of the plurality of online gaming sessions exceeds a predefined power threshold, the server system 114 selects the second sequence of compiled shaders and renders the plurality of image frames for each of the plurality of online gaming sessions using the second sequence of compiled shaders.

In some implementations, the server system 114 establishes a shader hash table that associates each of a plurality of performance criteria with a respective sequence of compiled shaders. In accordance with the shader hash, the performance criterion and the first sequence of compiled shaders are associated in the shader hash table. The shader hash table is stored in the shader cache. Further, in some implementations, the usage statistics include information of user inputs. A plurality of versions of the first sequence of compiled shaders are associated with the information of user inputs in the shader hash table. Additionally, in some implementations, the server system 114 dynamically updates the shader hash table according to the usage statistics, e.g., by replacing the first sequence of compiled shaders in the shader cache with the modified first sequence of compiled shaders.

It is noted that shader optimization is applicable not only to a single server having a CPU and a GPU, but also to a server system including a plurality of servers (i.e., having multiple CPUs and GPUs). More details on optimizing a sequence of compiled shaders used in gaming content rendering are discussed above with reference to FIGS. 10 and 11A-11C.

It should be understood that the particular order in which the operations in FIG. 12 have been described are merely exemplary and are not intended to indicate that the described order is the only order in which the operations could be performed. One of ordinary skill in the art would recognize various ways to optimize a sequence of compiled shaders as described herein. Additionally, it should be noted that details of other processes described herein with respect to methods 800 and 900 (e.g., FIGS. 8A-8B and 900) are also applicable in an analogous manner to method 1200 described above with respect to FIG. 12. For brevity, these details are not repeated here.

Some implementations of this application are directed to a server system including one or more CPUs, a plurality of GPUs, main dynamic memory storing programs and data for use by the CPUs and/or GPUs during program execution, a static memory pool stored in a non-volatile memory, and a memory controller configured to manage the static memory pool. Each of the GPUs includes a local cache and is configured to access the static memory pool via the memory controller. The server system executes a plurality of gaming sessions for a gaming title in parallel on the one or more CPUs. Each of the plurality of gaming sessions is associated with a static data item and requires a graphics operation executable by a respective GPU using the static data item, and the static data item is stored in the static memory pool. For each of a subset of gaming sessions executed on the one or more CPUs, the servers system assigns the graphics operation to a respective GPU, requests by the respective GPU a copy of the static data item from the memory controller, receives from the memory controller the first of the static data item read from the static memory pool, performing by the respective GPU the graphics operation using the copy of the static data item, and stores locally a result of the graphics operation in association with the respective gaming session.

In summary, some implementations of this application are directed to loading a gaming title on a server system that includes one or more CPUs, a plurality of GPUs, main dynamic memory storing programs and data for use by the CPUs and/or GPUs during program execution, a static memory pool stored in a non-volatile memory, and a memory controller configured to manage the static memory pool. The CPUs loads an executable gaming program corresponding to the gaming title to the main dynamic memory. The CPUs are configured to execute a plurality of online gaming sessions in parallel. Each of the gaming sessions corresponds to the executable gaming program, and requires a graphics operation executable by a respective GPU assigned to render the respective online gaming session. The CPUs identifies a static data item used in the graphics operation of the plurality of gaming sessions. The memory controller stores the static data item in the static memory pool, and enables the GPUs' executing the online gaming sessions to access the static data item while performing the graphics operation.

Some implementations of this application are directed to concurrent image rendering and shader optimization for a gaming title. A server system includes one or more CPUs, a plurality of GPUs, main dynamic memory storing programs and data for use by the CPUs and/or GPUs during program execution, and a shader cache The CPUs executes a plurality of online gaming sessions in parallel for a gaming title. The GPUs renders a plurality of image frames for each of the plurality of online gaming sessions using a first sequence of compiled shaders. While executing the plurality of online gaming sessions, the server system identities a performance criterion for the plurality of online gaming sessions associated with the gaming title, collects usage statistics characterizing execution of each of the online gaming sessions, and modifies a first shader in the first sequence of compiled shaders to improve performance of the first sequence of compiled shaders with respect to the performance criterion, thereby creating a modified first sequence of compiled shaders.

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of rendering image frames, comprising:
   identifying a performance criterion for a plurality of online gaming sessions associated with a gaming application;
   establishing a shader hash table that associates each of a plurality of performance criteria with a respective sequence of compiled shaders, including associating the identified performance criterion with a first sequence of compiled shaders in the shader hash table;
   based on a use of the first sequence of compiled shaders for one or more online gaming sessions of the plurality of online gaming sessions, generating a modified first sequence of compiled shaders by modifying a first shader in the first sequence of compiled shaders to improve performance of the first sequence of compiled shaders with respect to the identified performance criterion; and
   rendering, by one or more processors and based at least in part on the modified first sequence of compiled shaders, a plurality of image frames for at least one of the one or more online gaming sessions.

2. The method of claim 1, further comprising:
   storing the shader hash table and the first sequence of compiled shaders in a shader cache of a memory; and
   replacing the stored first sequence of compiled shaders with the modified first sequence of compiled shaders.

3. The method of claim 1, further comprising:
   storing in a shader cache of a memory the first sequence of compiled shaders as a first version of the first sequence of compiled shaders;
   storing in the shader cache the modified first sequence of compiled shaders as a second version of the first sequence of compiled shaders;
   collecting subsequent usage statistics characterizing execution of each of the online gaming sessions; and
   in accordance with the subsequent usage statistics, selecting one of the first and second versions of the first sequence of compiled shaders to render the plurality of image frames for each of one or more of the plurality of online gaming sessions.

4. The method of claim 1, wherein modifying the first shader in the first sequence of compiled shaders further comprises:
   selecting an alternative shader from a group of alternative shader options to replace the first shader in the first sequence of compiled shaders such that performance of the plurality of online gaming sessions satisfies the identified performance criterion, the modified first sequence of compiled shaders including the alternative shader.

5. The method of claim 1, further comprising:
   receiving a user instruction to modify the first shader in the first sequence of compiled shaders, and modifying the first shader in the first sequence of compiled shaders in response to the user instruction.

6. The method of claim 1, wherein the modifying of the first shader in the first sequence of compiled shaders is performed autonomously without user intervention to improve performance of the first sequence of compiled shaders with respect to the identified performance criterion.

7. The method of claim 1, wherein generating the modified first sequence of compiled shaders further comprises:
   modifying a second shader in the first sequence of compiled shaders to improve performance of the first sequence of compiled shaders with respect to the identified performance criterion.

8. The method of claim 1, further comprising:
   determining that the plurality of online gaming sessions are to be rendered in accordance with the identified performance criterion; and
   identifying the first sequence of compiled shaders for rendering the plurality of image frames for each of the plurality of online gaming sessions.

9. The method of claim 1, wherein the identified performance criterion includes a first performance criterion, wherein the plurality of online gaming sessions are rendered and executed in accordance with a second performance criterion distinct from the first performance criterion, and wherein the method further comprises:
   associating the second performance criterion with the first sequence of compiled shaders; and associating the first performance criterion with the modified first sequence of compiled shaders.

10. A server system, comprising:
one or more CPUs;
one or more GPUs; and
memory storing one or more programs for execution by the one or more CPUs and/or the one or more GPUs, the one or more programs comprising instructions to:
identify a performance criterion for a plurality of online gaming sessions associated with a gaming application;
establish a shader hash table that associates each of a plurality of performance criteria with a respective sequence of compiled shaders, including to associate the identified performance criterion with a first sequence of compiled shaders in the shader hash table;
based on a use of the first sequence of compiled shaders for one or more online gaming sessions of the plurality of online gaming sessions, generate a modified first sequence of compiled shaders, wherein to generate the modified first sequence includes to modify a first shader in the first sequence of compiled shaders to improve performance of the first sequence of compiled shaders with respect to the identified performance criterion; and
render, by the one or more CPUs and/or the one or more GPUs and based at least in part on the modified first sequence of compiled shaders, a plurality of image frames for at least one of the one or more online gaming sessions.

11. The server system of claim 10, wherein the one or more programs further comprise instructions to:
store in a shader cache of a memory the first sequence of compiled shaders as a first version of the first sequence of compiled shaders;
store in the shader cache the modified first sequence of compiled shaders as a second version of the first sequence of compiled shaders;
collect subsequent usage statistics characterizing execution of each of the online gaming sessions; and
in accordance with the subsequent usage statistics, select one of the first and second versions of the first sequence of compiled shaders to render the plurality of image frames for each of one or more of the plurality of online gaming sessions.

12. The server system of claim 10, wherein to modify the first shader in the first sequence of compiled shaders includes to:
select an alternative shader from a group of alternative shader options to replace the first shader in the first sequence of compiled shaders such that performance of the plurality of online gaming sessions satisfies the identified performance criterion, wherein the modified first sequence of compiled shaders includes the alternative shader.

13. The server system of claim 10, wherein the one or more programs further comprise instructions to modify the first shader in the first sequence of compiled shaders in response to a received user instruction.

14. The server system of claim 10, wherein to generate the modified first sequence of compiled shaders includes to:
modify a second shader in the first sequence of compiled shaders to improve performance of the first sequence of compiled shaders with respect to the identified performance criterion.

15. The server system of claim 10, wherein the one or more programs further comprise instructions to:
determine that the plurality of online gaming sessions are to be rendered in accordance with the identified performance criterion; and
identify the first sequence of compiled shaders for rendering the plurality of image frames for each of the plurality of online gaming sessions.

16. The server system of claim 10, wherein the identified performance criterion includes a first performance criterion, wherein the plurality of online gaming sessions are rendered and executed in accordance with a second performance criterion distinct from the first performance criterion, and wherein the one or more programs further comprise instructions to:
associate the second performance criterion with the first sequence of compiled shaders; and
associate the first performance criterion with the modified first sequence of compiled shaders.

17. A non-transitory computer-readable storage medium storing one or more programs configured for execution by one or more processors, the one or more programs comprising instructions to:
identify a performance criterion for a plurality of online gaming sessions associated with a gaming application;
establish a shader hash table that associates each of a plurality of performance criteria with a respective sequence of compiled shaders, including to associate the identified performance criterion with a first sequence of compiled shaders in the shader hash table;
based on a use of the first sequence of compiled shaders for one or more online gaming sessions of the plurality of online gaming sessions, generate a modified first sequence of compiled shaders, wherein to generate the modified first sequence includes to modify a first shader in the first sequence of compiled shaders to improve performance of the first sequence of compiled shaders with respect to the identified performance criterion; and
render, by the one or more processors and based at least in part on the modified first sequence of compiled shaders, a plurality of image frames for at least one of the one or more online gaming sessions.

18. The non-transitory computer-readable storage medium of claim 17, wherein the one or more programs further comprise instructions to:
store the shader hash table and the first sequence of compiled shaders in a shader cache of a memory; and
replace the stored first sequence of compiled shaders with the modified first sequence of compiled shaders.

19. The non-transitory computer-readable storage medium of claim 17, wherein the one or more programs further comprise instructions to:
store in a shader cache of a memory the first sequence of compiled shaders as a first version of the first sequence of compiled shaders;
store in the shader cache the modified first sequence of compiled shaders as a second version of the first sequence of compiled shaders;
collect subsequent usage statistics characterizing execution of each of the online gaming sessions; and
in accordance with the subsequent usage statistics, select one of the first and second versions of the first sequence of compiled shaders to render the plurality of image frames for each of one or more of the plurality of online gaming sessions.

20. The non-transitory computer-readable storage medium of claim 17, wherein to modify the first shader in the first sequence of compiled shaders includes to:
   select an alternative shader from a group of alternative shader options to replace the first shader in the first sequence of compiled shaders such that performance of the plurality of online gaming sessions satisfies the identified performance criterion, wherein the modified first sequence of compiled shaders includes the alternative shader.

21. The non-transitory computer-readable storage medium of claim 17, wherein the one or more programs further comprise instructions to:
   receive a user instruction to modify the first shader in the first sequence of compiled shaders, and modify the first shader in the first sequence of compiled shaders in response to the user instruction.

22. The non-transitory computer-readable storage medium of claim 17, wherein to generate the modified first sequence of compiled shaders includes to:
   modify a second shader in the first sequence of compiled shaders to improve performance of the first sequence of compiled shaders with respect to the identified performance criterion.

23. The non-transitory computer-readable storage medium of claim 17, wherein the one or more programs further comprise instructions to:
   determine that the plurality of online gaming sessions are to be rendered in accordance with the identified performance criterion; and
   identify the first sequence of compiled shaders for rendering the plurality of image frames for each of the plurality of online gaming sessions.

24. The non-transitory computer-readable storage medium of claim 17, wherein the identified performance criterion includes a first performance criterion, wherein the plurality of online gaming sessions are rendered and executed in accordance with a second performance criterion distinct from the first performance criterion, and wherein the one or more programs further comprise instructions to:
   associate the second performance criterion with the first sequence of compiled shaders; and
   associate the first performance criterion with the modified first sequence of compiled shaders.

* * * * *